(12) United States Patent
Ricci et al.

(10) Patent No.: US 9,324,234 B2
(45) Date of Patent: Apr. 26, 2016

(54) VEHICLE COMPRISING MULTI-OPERATING SYSTEM

(71) Applicant: AutoConnect Holdings LLC, Wellesley, MA (US)

(72) Inventors: Christopher P. Ricci, Saratoga, CA (US); Brian Reeves, Hamilton (CA); Paul E. Reeves, Oakville (CA); Richard Teltz, Hamilton (CA); David Reeves, Ancaster (CA); Sanjiv Sirpal, Oakville (CA); Chris Tyghe, Oakville (CA)

(73) Assignee: AutoConnect Holdings LLC, Wellesley, MA (US)

( * ) Notice: Subject to any disclaimer, the term of this patent is extended or adjusted under 35 U.S.C. 154(b) by 231 days.

(21) Appl. No.: 13/679,459

(22) Filed: Nov. 16, 2012

(65) Prior Publication Data

US 2013/0167159 A1    Jun. 27, 2013

Related U.S. Application Data

(63) Continuation-in-part of application No. 13/217,108, filed on Aug. 24, 2011, now Pat. No. 8,898,443.

(60) Provisional application No. 61/560,509, filed on Nov. 16, 2011, provisional application No. 61/637,164,
(Continued)

(51) Int. Cl.
  *G08G 1/0967* (2006.01)
  *G06F 9/54* (2006.01)
(Continued)

(52) U.S. Cl.
  CPC .......... *G08G 1/096791* (2013.01); *B60K 35/00* (2013.01); *B60K 37/00* (2013.01); *B60K 37/02* (2013.01); *B60K 37/06* (2013.01); *B60R 7/04* (2013.01); *B60R 16/037* (2013.01);
(Continued)

(58) Field of Classification Search
  CPC ..................................................... G06F 9/4401
  USPC ............................................................ 713/2
  See application file for complete search history.

(56) References Cited

U.S. PATENT DOCUMENTS 5,296,840 A    3/1994   Gieffers
5,363,306 A   11/1994   Kuwahara et al.
(Continued)

OTHER PUBLICATIONS

"A8: Technology as standard," Screen-shots from Audi.co.uk, 2014 [retrieved on Apr. 16, 2014], 1 page. Retrieved from: www.audi.co.uk/new-cars/a8/a8/technology-as-standard/mmi-touch.html.
(Continued)

*Primary Examiner* — Suresh Suryawanshi
(74) *Attorney, Agent, or Firm* — Sheridan Ross P.C.

(57) ABSTRACT

A mobile computing device with a mobile operating system and personal computer or vehicle processing module operating system running concurrently and independently on a shared kernel without virtualization. The mobile operating system provides a user experience for the mobile computing device that suits the mobile environment. The personal computer operating system provides a full personal computer user experience when the mobile computing device is docked to a secondary terminal environment. The vehicle processing module operating system provides a full vehicle processing module user experience when the mobile computing device is docked to a secondary terminal environment. The mobile computing device may be a smartphone running the Android mobile OS and a full desktop Linux distribution on a modified Android kernel.

37 Claims, 15 Drawing Sheets

Related U.S. Application Data filed on Apr. 23, 2012, provisional application No. 61/646,747, filed on May 14, 2012, provisional application No. 61/653,275, filed on May 30, 2012, provisional application No. 61/635,264, filed on May 30, 2012, provisional application No. 61/653,563, filed on May 31, 2012, provisional application No. 61/663,335, filed on Jun. 22, 2012, provisional application No. 61/672,483, filed on Jul. 17, 2012, provisional application No. 61/714,016, filed on Oct. 15, 2012, provisional application No. 61/715,699, filed on Oct. 18, 2012, provisional application No. 61/507,203, filed on Jul. 13, 2011, provisional application No. 61/507,206, filed on Jul. 13, 2011, provisional application No. 61/507,209, filed on Jul. 13, 2011, provisional application No. 61/389,117, filed on Oct. 1, 2010, provisional application No. 61/507,201, filed on Jul. 13, 2011.

(51) Int. Cl.

| | | |
|---|---|---|
| B60R 7/04 | (2006.01) | |
| G08C 19/00 | (2006.01) | |
| G06N 5/02 | (2006.01) | |
| H04L 29/08 | (2006.01) | |
| G08G 1/14 | (2006.01) | |
| H04W 84/00 | (2009.01) | |
| H04W 4/00 | (2009.01) | |
| H04W 4/04 | (2009.01) | |
| G06Q 40/08 | (2012.01) | |
| G06F 17/00 | (2006.01) | |
| G06F 17/30 | (2006.01) | |
| G06F 3/0484 | (2013.01) | |
| G08G 1/16 | (2006.01) | |
| G06F 13/364 | (2006.01) | |
| H04N 21/482 | (2011.01) | |
| G06F 21/10 | (2013.01) | |
| G06Q 30/02 | (2012.01) | |
| G06F 13/14 | (2006.01) | |
| B60R 16/037 | (2006.01) | |
| B60W 30/182 | (2012.01) | |
| G01C 21/20 | (2006.01) | |
| B60K 35/00 | (2006.01) | |
| B60K 37/02 | (2006.01) | |
| G06F 3/01 | (2006.01) | |
| G06F 3/0488 | (2013.01) | |
| G08G 1/017 | (2006.01) | |
| B60K 37/00 | (2006.01) | |
| B60K 37/06 | (2006.01) | |
| B60W 40/08 | (2012.01) | |
| B60W 50/00 | (2006.01) | |

(52) U.S. Cl.
CPC .............. *B60W30/182* (2013.01); *G01C 21/20* (2013.01); *G06F 3/017* (2013.01); *G06F 3/0484* (2013.01); *G06F 3/0488* (2013.01); *G06F 3/04883* (2013.01); *G06F 9/54* (2013.01); *G06F 13/14* (2013.01); *G06F 13/364* (2013.01); *G06F 17/00* (2013.01); *G06F 17/30386* (2013.01); *G06F 21/10* (2013.01); *G06N 5/02* (2013.01); *G06Q 30/0265* (2013.01); *G06Q 40/08* (2013.01); *G08C 19/00* (2013.01); *G08G 1/017* (2013.01); *G08G 1/143* (2013.01); *G08G 1/16* (2013.01); *H04L 67/02* (2013.01); *H04N 21/482* (2013.01); *H04W 4/001* (2013.01); *H04W 4/046* (2013.01); *H04W 84/005* (2013.01); *B60K 2350/1028* (2013.01); *B60K 2350/1052* (2013.01); *B60K 2350/2013* (2013.01); *B60K 2350/941* (2013.01); *B60W 2040/0872* (2013.01); *B60W 2050/0095* (2013.01); *B60W 2540/22* (2013.01); *B60W 2540/26* (2013.01); *B60W 2540/28* (2013.01); *G06F 2203/04808* (2013.01)

(56) References Cited

U.S. PATENT DOCUMENTS

| | | | |
|---|---|---|---|
| 5,508,689 A | 4/1996 | Rado et al. | |
| 5,648,769 A | 7/1997 | Sato et al. | |
| 5,710,702 A | 1/1998 | Hayashi et al. | |
| 5,742,825 A | 4/1998 | Mathur et al. | |
| 5,764,984 A * | 6/1998 | Loucks | 719/319 |
| 5,794,164 A | 8/1998 | Beckert et al. | |
| 5,838,251 A | 11/1998 | Brinkmeyer et al. | |
| 5,874,928 A | 2/1999 | Kou | |
| 5,890,080 A | 3/1999 | Coverdill et al. | |
| 6,175,789 B1 * | 1/2001 | Beckert et al. | 701/29.1 |
| 6,302,438 B1 | 10/2001 | Stopper, Jr. et al. | |
| 6,460,136 B1 | 10/2002 | Krohmer et al. | |
| 6,484,082 B1 | 11/2002 | Millsap et al. | |
| 6,502,022 B1 | 12/2002 | Chastain et al. | |
| 6,678,747 B2 | 1/2004 | Goossen et al. | |
| 6,681,176 B2 | 1/2004 | Funk et al. | |
| 6,690,940 B1 | 2/2004 | Brown et al. | |
| 6,724,920 B1 | 4/2004 | Berenz et al. | |
| 6,782,240 B1 | 8/2004 | Tabe | |
| 6,970,173 B2 | 11/2005 | Ciolac | |
| 6,990,573 B2 | 1/2006 | Cherian et al. | |
| 7,019,641 B1 | 3/2006 | Lakshmanan et al. | |
| 7,062,365 B1 * | 6/2006 | Fei | 701/36 |
| 7,167,974 B2 | 1/2007 | Roth et al. | |
| 7,295,921 B2 | 11/2007 | Spencer et al. | |
| 7,343,148 B1 | 3/2008 | O'Neil | |
| 7,474,264 B2 | 1/2009 | Bolduc et al. | |
| 7,493,140 B2 | 2/2009 | Michmerhuizen et al. | |
| 7,506,375 B2 * | 3/2009 | Kanda et al. | 726/25 |
| 7,526,774 B1 | 4/2009 | Beck et al. | |
| 7,548,815 B2 | 6/2009 | Watkins et al. | |
| 7,549,041 B2 * | 6/2009 | Wang | 713/2 |
| 7,606,660 B2 | 10/2009 | Diaz et al. | |
| 7,643,913 B2 | 1/2010 | Taki et al. | |
| 7,734,315 B2 | 6/2010 | Rathus et al. | |
| 7,738,462 B2 | 6/2010 | Hwang | |
| RE41,449 E | 7/2010 | Krahnstoever et al. | |
| 7,870,321 B2 | 1/2011 | Rofougaran | |
| 7,891,004 B1 | 2/2011 | Gelvin et al. | |
| 7,899,610 B2 | 3/2011 | McClellan | |
| 8,151,100 B2 | 4/2012 | Rofougaran et al. | |
| 8,195,860 B2 | 6/2012 | Rofougaran | |
| 8,346,432 B2 | 1/2013 | Van Wiemeersch et al. | |
| 8,432,260 B2 | 4/2013 | Talty et al. | |
| 8,527,143 B2 | 9/2013 | Tan | |
| 8,532,574 B2 | 9/2013 | Kirsch | |
| 8,583,292 B2 | 11/2013 | Preston et al. | |
| 8,644,165 B2 | 2/2014 | Saarimaki et al. | |
| 8,683,496 B2 * | 3/2014 | Reeves et al. | 719/319 |
| 8,706,143 B1 | 4/2014 | Elias | |
| 8,725,311 B1 | 5/2014 | Breed | |
| 8,726,294 B2 * | 5/2014 | Benedek et al. | 719/313 |
| 8,761,673 B2 | 6/2014 | Sakata | |
| 8,774,842 B2 | 7/2014 | Jones et al. | |
| 8,817,761 B2 | 8/2014 | Gruberman et al. | |
| 8,819,180 B2 * | 8/2014 | Reeves et al. | 709/218 |
| 8,819,705 B2 * | 8/2014 | Reeves et al. | 719/318 |
| 8,838,088 B1 | 9/2014 | Henn et al. | |
| 8,868,899 B2 * | 10/2014 | Galicia et al. | 713/100 |
| 8,898,443 B2 * | 11/2014 | Reeves et al. | 713/1 |
| 8,933,949 B2 * | 1/2015 | Reeves et al. | 345/522 |
| 8,957,905 B2 * | 2/2015 | Reeves et al. | 345/541 |
| 8,963,939 B2 * | 2/2015 | Yusupov et al. | 345/541 |
| 2001/0020268 A1 | 9/2001 | Kawano et al. | |
| 2002/0023010 A1 | 2/2002 | Rittmaster et al. | |

(56) References Cited

U.S. PATENT DOCUMENTS

| | | |
|---|---|---|
| 2002/0045484 A1 | 4/2002 | Eck et al. |
| 2002/0105968 A1 | 8/2002 | Pruzan et al. |
| 2003/0007227 A1 | 1/2003 | Ogino |
| 2003/0158638 A1 | 8/2003 | Yakes et al. |
| 2003/0182435 A1 | 9/2003 | Redlich et al. |
| 2004/0024502 A1 | 2/2004 | Squires et al. |
| 2004/0255123 A1 | 12/2004 | Noyama et al. |
| 2005/0031100 A1 | 2/2005 | Iggulden et al. |
| 2005/0042999 A1 | 2/2005 | Rappaport |
| 2005/0130744 A1 | 6/2005 | Eck et al. |
| 2005/0149752 A1 | 7/2005 | Johnson et al. |
| 2005/0153760 A1 | 7/2005 | Varley |
| 2006/0010314 A1* | 1/2006 | Xu .......... 713/2 |
| 2006/0042846 A1 | 3/2006 | Kojori et al. |
| 2006/0047386 A1 | 3/2006 | Kanevsky et al. |
| 2006/0125631 A1 | 6/2006 | Sharony |
| 2006/0250272 A1 | 11/2006 | Puamau |
| 2006/0274829 A1 | 12/2006 | Siemens et al. |
| 2007/0015485 A1 | 1/2007 | DeBiasio et al. |
| 2007/0033260 A1 | 2/2007 | Grouzdev et al. |
| 2007/0050765 A1 | 3/2007 | Geisinger |
| 2007/0050770 A1 | 3/2007 | Geisinger |
| 2007/0057781 A1 | 3/2007 | Breed |
| 2007/0067769 A1 | 3/2007 | Geisinger |
| 2007/0074191 A1 | 3/2007 | Geisinger |
| 2007/0074192 A1 | 3/2007 | Geisinger |
| 2007/0103328 A1 | 5/2007 | Lakshmanan et al. |
| 2007/0120697 A1 | 5/2007 | Ayoub et al. |
| 2007/0136721 A1 | 6/2007 | Dunshea et al. |
| 2007/0156317 A1 | 7/2007 | Breed |
| 2007/0271557 A1 | 11/2007 | Geisinger |
| 2007/0283324 A1 | 12/2007 | Geisinger |
| 2008/0028401 A1 | 1/2008 | Geisinger |
| 2008/0051957 A1 | 2/2008 | Breed et al. |
| 2008/0082815 A1 | 4/2008 | Kawano et al. |
| 2008/0090522 A1 | 4/2008 | Oyama |
| 2008/0129475 A1 | 6/2008 | Breed et al. |
| 2008/0140278 A1 | 6/2008 | Breed |
| 2008/0148374 A1 | 6/2008 | Spaur et al. |
| 2008/0174451 A1 | 7/2008 | Harrington et al. |
| 2008/0212215 A1 | 9/2008 | Schofield et al. |
| 2008/0234919 A1 | 9/2008 | Ritter et al. |
| 2008/0253613 A1 | 10/2008 | Jones et al. |
| 2008/0305780 A1 | 12/2008 | Williams et al. |
| 2009/0055601 A1 | 2/2009 | McKenney et al. |
| 2009/0082951 A1 | 3/2009 | Graessley |
| 2009/0089569 A1 | 4/2009 | Baribault et al. |
| 2009/0158299 A1 | 6/2009 | Carter |
| 2009/0180668 A1 | 7/2009 | Jones et al. |
| 2009/0196280 A1 | 8/2009 | Rofougaran |
| 2009/0197641 A1 | 8/2009 | Rofougaran et al. |
| 2009/0197642 A1 | 8/2009 | Rofougaran et al. |
| 2009/0198798 A1 | 8/2009 | Rofougaran et al. |
| 2009/0198854 A1 | 8/2009 | Rofougaran et al. |
| 2009/0198989 A1 | 8/2009 | Rofougaran et al. |
| 2009/0224931 A1 | 9/2009 | Dietz et al. |
| 2009/0275321 A1 | 11/2009 | Crow |
| 2009/0278750 A1 | 11/2009 | Man et al. |
| 2009/0278806 A1 | 11/2009 | Duarte et al. |
| 2009/0279839 A1 | 11/2009 | Nakamura et al. |
| 2010/0042498 A1 | 2/2010 | Schalk |
| 2010/0060549 A1 | 3/2010 | Tsern |
| 2010/0088635 A1 | 4/2010 | Louch |
| 2010/0090817 A1 | 4/2010 | Yamaguchi et al. |
| 2010/0097239 A1 | 4/2010 | Campbell et al. |
| 2010/0097386 A1 | 4/2010 | Kim et al. |
| 2010/0144284 A1 | 6/2010 | Chutorash et al. |
| 2010/0202346 A1 | 8/2010 | Sitzes et al. |
| 2010/0217835 A1 | 8/2010 | Rofougaran |
| 2010/0217836 A1 | 8/2010 | Rofougaran |
| 2010/0217912 A1 | 8/2010 | Rofougaran |
| 2010/0222939 A1 | 9/2010 | Namburu et al. |
| 2010/0235042 A1 | 9/2010 | Ying |
| 2010/0253493 A1 | 10/2010 | Szczerba et al. |
| 2010/0295676 A1 | 11/2010 | Khachaturov et al. |
| 2011/0016299 A1 | 1/2011 | Galicia et al. |
| 2011/0021213 A1 | 1/2011 | Carr |
| 2011/0021234 A1 | 1/2011 | Tibbitts et al. |
| 2011/0035098 A1 | 2/2011 | Goto et al. |
| 2011/0053506 A1 | 3/2011 | Lemke et al. |
| 2011/0092159 A1 | 4/2011 | Park et al. |
| 2011/0093691 A1 | 4/2011 | Galicia et al. |
| 2011/0105097 A1 | 5/2011 | Tadayon et al. |
| 2011/0106375 A1 | 5/2011 | Sundaram et al. |
| 2011/0112969 A1 | 5/2011 | Zaid et al. |
| 2011/0117933 A1 | 5/2011 | Andersson |
| 2011/0137520 A1 | 6/2011 | Rector et al. |
| 2011/0195699 A1 | 8/2011 | Tadayon et al. |
| 2011/0267204 A1 | 11/2011 | Chuang et al. |
| 2012/0006610 A1 | 1/2012 | Wallace et al. |
| 2012/0071097 A1 | 3/2012 | Matsushita et al. |
| 2012/0081267 A1 | 4/2012 | Sirpal et al. |
| 2012/0081311 A1 | 4/2012 | Sirpal et al. |
| 2012/0084542 A1 | 4/2012 | Reeves et al. |
| 2012/0084735 A1 | 4/2012 | Sirpal |
| 2012/0084792 A1 | 4/2012 | Benedek et al. |
| 2012/0089299 A1 | 4/2012 | Breed |
| 2012/0109446 A1 | 5/2012 | Yousefi et al. |
| 2012/0110356 A1 | 5/2012 | Yousefi et al. |
| 2012/0115446 A1 | 5/2012 | Gautama et al. |
| 2012/0116609 A1 | 5/2012 | Jung et al. |
| 2012/0116678 A1 | 5/2012 | Witmer |
| 2012/0173900 A1 | 7/2012 | Diab et al. |
| 2012/0173905 A1 | 7/2012 | Diab et al. |
| 2012/0238286 A1 | 9/2012 | Mallavarapu et al. |
| 2012/0242510 A1 | 9/2012 | Choi et al. |
| 2012/0259951 A1 | 10/2012 | Schalk et al. |
| 2012/0274459 A1 | 11/2012 | Jaisimha et al. |
| 2012/0284292 A1 | 11/2012 | Rechsteiner et al. |
| 2012/0289217 A1 | 11/2012 | Riemer et al. |
| 2012/0296567 A1 | 11/2012 | Breed |
| 2012/0313771 A1 | 12/2012 | Wittliff, III |
| 2013/0035063 A1 | 2/2013 | Fisk et al. |
| 2013/0099940 A1 | 4/2013 | Protopapas |
| 2013/0134730 A1 | 5/2013 | Ricci |
| 2013/0135118 A1 | 5/2013 | Ricci |
| 2013/0138591 A1 | 5/2013 | Ricci |
| 2013/0138714 A1 | 5/2013 | Ricci |
| 2013/0141247 A1 | 6/2013 | Ricci |
| 2013/0141252 A1 | 6/2013 | Ricci |
| 2013/0143495 A1 | 6/2013 | Ricci |
| 2013/0143546 A1 | 6/2013 | Ricci |
| 2013/0143601 A1 | 6/2013 | Ricci |
| 2013/0144459 A1 | 6/2013 | Ricci |
| 2013/0144460 A1 | 6/2013 | Ricci |
| 2013/0144461 A1 | 6/2013 | Ricci |
| 2013/0144462 A1 | 6/2013 | Ricci |
| 2013/0144463 A1 | 6/2013 | Ricci et al. |
| 2013/0144469 A1 | 6/2013 | Ricci |
| 2013/0144470 A1 | 6/2013 | Ricci |
| 2013/0144474 A1 | 6/2013 | Ricci |
| 2013/0144486 A1 | 6/2013 | Ricci |
| 2013/0144520 A1 | 6/2013 | Ricci |
| 2013/0144657 A1 | 6/2013 | Ricci |
| 2013/0145065 A1 | 6/2013 | Ricci |
| 2013/0145279 A1 | 6/2013 | Ricci |
| 2013/0145297 A1 | 6/2013 | Ricci et al. |
| 2013/0145360 A1 | 6/2013 | Ricci |
| 2013/0145401 A1 | 6/2013 | Ricci |
| 2013/0145482 A1 | 6/2013 | Ricci et al. |
| 2013/0147638 A1 | 6/2013 | Ricci |
| 2013/0151031 A1 | 6/2013 | Ricci |
| 2013/0151065 A1 | 6/2013 | Ricci |
| 2013/0151088 A1 | 6/2013 | Ricci |
| 2013/0152003 A1 | 6/2013 | Ricci et al. |
| 2013/0154298 A1 | 6/2013 | Rici |
| 2013/0157640 A1 | 6/2013 | Aycock |
| 2013/0158821 A1 | 6/2013 | Ricci |
| 2013/0166097 A1 | 6/2013 | Ricci |
| 2013/0179689 A1 | 7/2013 | Matsumoto et al. |
| 2013/0190978 A1 | 7/2013 | Kato et al. |
| 2013/0198737 A1 | 8/2013 | Ricci |
| 2013/0198802 A1 | 8/2013 | Ricci |
| 2013/0200991 A1 | 8/2013 | Ricci et al. |

(56) References Cited

U.S. PATENT DOCUMENTS

| | | | |
|---|---|---|---|
| 2013/0203400 A1 | 8/2013 | Ricci |
| 2013/0204466 A1 | 8/2013 | Ricci |
| 2013/0204484 A1 | 8/2013 | Ricci |
| 2013/0204493 A1 | 8/2013 | Ricci et al. |
| 2013/0204943 A1 | 8/2013 | Ricci |
| 2013/0205026 A1 | 8/2013 | Ricci |
| 2013/0205412 A1 | 8/2013 | Ricci |
| 2013/0212659 A1 | 8/2013 | Maher et al. |
| 2013/0218412 A1 | 8/2013 | Ricci |
| 2013/0219039 A1 | 8/2013 | Ricci |
| 2013/0227648 A1 | 8/2013 | Ricci |
| 2013/0231800 A1 | 9/2013 | Ricci |
| 2013/0241720 A1 | 9/2013 | Ricci et al. |
| 2013/0245882 A1 | 9/2013 | Ricci |
| 2013/0250933 A1 | 9/2013 | Yousefi et al. |
| 2013/0288606 A1 | 10/2013 | Kirsch |
| 2013/0295901 A1 | 11/2013 | Abramson et al. |
| 2013/0309977 A1 | 11/2013 | Heines et al. |
| 2014/0032014 A1 | 1/2014 | DeBiasio et al. |
| 2014/0066014 A1 | 3/2014 | Nicholson et al. |
| 2014/0088798 A1 | 3/2014 | Himmelstein |
| 2014/0120829 A1 | 5/2014 | Bhamidipati et al. |
| 2014/0125802 A1 | 5/2014 | Beckert et al. |

OTHER PUBLICATIONS

"Audi A8 MMI Touch," Audi of America, Jan. 7, 2011, [retrieved on Apr. 16, 2014], 2 pages. Retrieved from: www.youtube.com/watch?v=O2nZ-WHo9IA.

Diaz, "Audi New MMI Touch Input System Makes Perfect Sense," Gizmodo.com, Dec. 1, 2009 [retrieved on Apr. 16, 2014], 12 pages. Retrieved from: http://gizmodo.com/5416342/audi-new-mmi-touch-input-system-makes-perfect-sense.

Haselton, "Celio Announces Redfly Smart Phone Dock, Software for Windows PCs," LAPTOP Magazine, Jan. 8, 2009, [retrieved on Feb. 11, 2014], 4 pages. Retrieved from: blog.laptopmag.com/redfly-launches-smartphone-dock-software-for-windows-pcs.

International Preliminary Report on Patentability for International (PCT) Patent Application No. PCT/US2012/065510, mailed May 30, 2014 14 pages.

International Preliminary Report on Patentability for International (PCT) Patent Application No. PCT/US2012/065613, mailed May 30, 2014 8 pages.

International Search Report and Written Opinion for International (PCT) Patent Application No. PCT/US14/19209, mailed Apr. 25, 2014.

Extended Search Report for European Patent Application No. 11829766.2, dated Jan. 8, 2014 11 pages.

Official Action for U.S. Appl. No. 13/679,857, mailed Jun. 27, 2014 5 pages.

Official Action for U.S. Appl. No. 13/679,875, mailed Apr. 7, 2014 7 pages Restriction Requirement.

Official Action for U.S. Appl. No. 13/679,441, mailed May 9, 2014 6 pages.

Official Action for U.S. Appl. No. 13/679,476, mailed May 20, 2014 19 pages.

Official Action for U.S. Appl. No. 13/828,513, mailed May 6, 2014 7 pages.

Official Action for U.S. Appl. No. 13/829,718, mailed Apr. 10, 2014 7 pages.

Official Action for U.S. Appl. No. 13/830,003, mailed Apr. 15, 2014 9 pages.

Notice of Allowance for U.S. Appl. No. 13/678,773, mailed Apr. 2, 2014 5 pages.

Official Action for U.S. Appl. No. 13/679,887, mailed Jun. 30, 2014 6 pages.

Official Action for U.S. Appl. No. 13/217,108, mailed Oct. 11, 2013 13 pages.

Official Action for U.S. Appl. No. 13/217,108 mailed Feb. 25, 2014, 22 pages.

Official Action for U.S. Appl. No. 13/217,108, mailed Jun. 20, 2014 18 pages.

International Search Report and Written Opinion for International (PCT) Patent Application No. PCT/US2014/019983, mailed Aug. 18, 2014 10 pages.

International Search Report and Written Opinion for International (PCT) Patent Application No. PCT/US14/19216, mailed Jul. 25, 2014 8 pages.

International Search Report and Written Opinion for International (PCT) Patent Application No. PCT/US14/19201, mailed Jul. 29, 2014 11 pages.

Official Action for U.S. Appl. No. 13/679,878, mailed Sep. 26, 2014 7 pages.

Official Action for U.S. Appl. No. 13/679,875, mailed Jul. 17, 2014 13 pages.

Notice of Allowance for U.S. Appl. No. 13/679,441, mailed Jul. 22, 2014 5 pages.

Official Action for U.S. Appl. No. 13/828,513, mailed Sep. 4, 2014 5 pages.

Official Action for U.S. Appl. No. 13/828,651, mailed Jul. 29, 2014 17 pages.

Notice of Allowance for U.S. Appl. No. 13/829,157, mailed Jul. 25, 2014 14 pages.

Official Action for U.S. Appl. No. 13/829,505, mailed Jul. 23, 2014 7 pages.

Official Action for U.S. Appl. No. 13/829,718, mailed Jul. 25, 2014 8 pages.

Official Action for U.S. Appl. No. 13/830,003, mailed Jul. 25, 2014 9 pages.

Official Action for U.S. Appl. No. 13/830,133, mailed Jul. 10, 2014 9 pages.

Notice of Allowance for U.S. Appl. No. 13/217,108, mailed Jul. 11, 2014 7 pages.

"Apple iPod and iPhone dock Connector Pinout," AllPinouts, Sep. 27, 2010, 3 pages [www.allpinouts.org/index/php/Apple_iPod,_iPad_and_iPhone_dock].

"How to Install Ubuntu on Your Nexus One/Android!" NexusOneHacks.net, Jul. 6, 2010, 9 pages [nexusonehacks.net/nexus-one-hacks/how-to-install-ubuntu-on-your-android].

Purcher "Apple Invents In-Vehicle Holistic ID for "iOS in the Car"," Patently Apple, Dec. 2013, 8 pages [retrieved on Dec. 12, 2013 from: www.patentlyapple.com/patently-apple/2013/12/apple-invents-in-vehicle-holistic-id-for-ios-in-the-car.html].

Stallman "GNU Operating System: Android and Users' Freedom," Sep. 2, 2013, 4 pages [gnu.org/philosophy/android-and-users-freedom.html].

Official Action for U.S. Appl. No. 13/679,441, mailed Jan. 16, 2014 6 pages.

Official Action for U.S. Appl. No. 13/679,476, mailed Oct. 11, 2013 13 pages.

Official Action for U.S. Appl. No. 13/678,773, mailed Dec. 30, 2013 9 pages.

U.S. Appl. No. 13/462,593, filed May 2, 2012, Ricci et al.
U.S. Appl. No. 13/462,596, filed May 2, 2012, Ricci et al.
U.S. Appl. No. 13/829,605, filed Mar. 14, 2013, Ricci.
U.S. Appl. No. 13/830,066, filed Mar. 14, 2013, Ricci et al.
U.S. Appl. No. 13/840,240, filed Mar. 15, 2013, Ricci.

"Cadillac: 2013 XTS Full-Size Luxury Sedan," Cadillac.com, 4 pages, Jun. 2012 internet archive, found at: (web.archive.org/web/20120606185204/http://www.cadillac.com/xts-luxury-sedan.html).

Lee "Cadillac revamps the instrument panel with CUE," CNET Reviews, Oct. 11, 2011, 5 pages, found at: (reviews.cnet.com/8301-12261_7-20118807-10356022/cadillac-revamps-the-instrument-panel-with-cue/).

Marturano "General Motors Takes a CUE from Customers," InContext, Nov. 8, 2011, 3 pages, found at: (incontextdesign.com/blog/general-motors-takes-a-cue-from-customers/).

International Search Report and Written Opinion for International (PCT) Patent Application No. PCT/US12/65510, mailed May 6, 2013 17 pages.

International Search Report and Written Opinion for International (PCT) Patent Application No. PCT/US12/65613, mailed Feb. 15, 2013 9 pages.

(56) References Cited

OTHER PUBLICATIONS

Official Action for U.S. Appl. No. 13/679,441, mailed Sep. 5, 2013 6 pages.
Official Action for U.S. Appl. No. 6583-315, mailed Jul. 9, 2013 10 pages.
"Time-triggered CAN," CIA, © 2001-2013, 4 pages, found at: (www.can-cia.org/index.php?id+166).
Davis et al. "Controller Area Network (CAN) schedulability analysis: Refuted, revisited and revised," Real-Time Systems, Apr. 2007, vol. 35, No. 3, pp. 239-272.
Di Natale "Controller Area Network," Dec. 2009, 54 pages.
Fonseca et al. "Scheduling for a TTCAN network with a stochastic optimization algorithm," Proceedings 8th Internatioanl CAN Conference, Jan. 2002, 7 pages.
Hartwich et al. "CAN Network with Time Triggered Communication," Robert Bosch GmbH Proceedings 7th International CAN Conference, Jul. 2000, 7 pages.
Idstein et al. "Using the Controller Area Network for Communication Between Prostesis Sensors and Control Systems," Proceedings of the 2011 MyoElectric Controls/Powered Prostetics Symposium Fredericton, New Brunswick, Canada, Aug. 14-19, 2011, 4 pages.
Notice of Allowance for U.S. Appl. No. 13/679,857, mailed Dec. 3, 2014 5 pages.
Notice of Allowance for U.S. Appl. No. 13/679,878, mailed Feb. 2, 2015 5 pages.
Official Action for U.S. Appl. No. 13/679,875, mailed Dec. 26, 2014 14 pages.
Official Action for U.S. Appl. No. 13/679,676, mailed Feb. 25, 2015 14 pages.
Notice of Allowance for U.S. Appl. No. 13/679,441, mailed Oct. 29, 2014 5 pages.
Official Action for U.S. Appl. No. 13/679,864, mailed Nov. 3, 2014 9 pages.
Official Action for U.S. Appl. No. 13/679,479, mailed Jan. 16, 2015 23 pages.
Official Action for U.S. Appl. No. 13/828,513, mailed Dec. 24, 2014 7 pages.
Notice of Allowance for U.S. Appl. No. 13/828,651, mailed Feb. 2, 2015 10 pages.
Official Action for U.S. Appl. No. 13/828,758, mailed Feb. 12, 2015 10 pages.
Official Action for U.S. Appl. No. 13/828,860, mailed Feb. 27, 2015 16 pages.
Official Action for U.S. Appl. No. 13/828,960, mailed Jan. 5, 2015 15 pages.
Notice of Allowance for U.S. Appl. No. 13/829,505, mailed Nov. 26, 2014 8 pages.
Notice of Allowance for U.S. Appl. No. 13/829,718, mailed Nov. 21, 2014 5 pages.
Notice of Allowance for U.S. Appl. No. 13/830,003, mailed Nov. 21, 2014 7 pages.
Official Action for U.S. Appl. No. 13/830,133, mailed Oct. 29, 2014 31 pages.
Notice of Allowance for U.S. Appl. No. 13/830,133, mailed Mar. 3, 2015 5 pages.
Notice of Allowance for U.S. Appl. No. 13/679,887, mailed Nov. 13, 2014 5 pages.
U.S. Appl. No. 14/468,055, filed Aug. 25, 2014, Ricci
U.S. Appl. No. 14/485,467, filed Sep. 12, 2014, Ricci.
International Search Report for International Patent Application No. PCT/US2011/052988, mailed May 3, 2012, 5 pages.
Written Opinion for International Patent Application No. PCT/US2011/052988, mailed May 3, 2012, 4 pages.
International Preliminary Report on Patentability for International Patent Application No. PCT/US2011/052988, mailed Apr. 11, 2013, 6 pages.
Official Action for U.S. Appl. No. 14/539,016, mailed Jun. 8, 2015 9 pages.
Official Action for U.S. Appl. No. 13/251,434 mailed Jun. 20, 2013, 14 pages.
Official Action for U.S. Appl. No. 13/251,434 mailed Jan. 13, 2014, 18 pages.
Notice of Allowance for U.S. Appl. No. 13/251,434 mailed Apr. 8, 2014, 12 pages.

\* cited by examiner

VEHICLE COMPRISING MULTI-OPERATING SYSTEM

CROSS REFERENCE TO RELATED APPLICATION

The present application is a continuation-in-part of U.S. patent application Ser. No. 13/217,108, filed Aug. 24, 2011, entitled "MULTI-OPERATING SYSTEM", which claims the benefits of U.S. Provisional Application Nos. 61/389,117, filed Oct. 1, 2010, entitled "Multi-Operating System Portable Docking Device"; 61/507,201, filed Jul. 13, 2011, entitled "Cross-Environment Communication Framework"; 61/507,203, filed Jul. 13, 2011, entitled "Multi-Operating System"; 61/507,206, filed Jul. 13, 2011, entitled "Auto-Configuration of a Docked System in a Multi-OS Environment"; and 61/507,209, filed Jul. 13, 2011, entitled "Auto-Waking of a Suspended Secondary OS in a Dockable System," each of which is incorporated herein by this reference in its entirety.

The present application claims the benefits of U.S. Provisional Application Serial Nos. 61/560,509, filed Nov. 16, 2011; 61/637,164, filed Apr. 23, 2012; and 61/663,335, filed Jun. 22, 2012, all entitled "COMPLETE VEHICLE ECOSYSTEM", 61/646,747, filed on May 14, 2012, entitled "Branding of Electrically Propelled Vehicles Via the Generation of Specific Operating Sounds"; 61/653,275, filed on May 30, 2012, entitled "Vehicle Application Store for Console"; 61/653,264, filed on May 30, 2012, entitled "Control of Device Features Based on Vehicle State"; 61/653,563, filed on May 31, 2012, entitled "Complete Vehicle Ecosystem"; 61/672,483, filed on Jul. 17, 2012, entitled "Vehicle Climate Control"; 61/714,016, filed on Oct. 15, 2012, entitled "Vehicle Middleware"; and 61/715,699, filed Oct. 18, 2012, entitled "Vehicle Middleware"; each of which is incorporated herein by this reference in its entirety.

Cross reference is made to U.S. patent application Ser. Nos. 13/420,236, filed on Mar. 14, 2012, entitled, "Configurable Vehicle Console"; 13/420,240, filed on Mar. 14, 2012, entitled "Removable, Configurable Vehicle Console"; 13/462,593, filed on May 2, 2012, entitled "Configurable Dash Display"; 13/462,596, filed on May 2, 2012, entitled "Configurable Heads-Up Dash Display"; 13/679,234, filed on Nov. 16, 2012, entitled "Gesture Recognition for On-Board Display"; 13/679,412, filed on Nov. 16, 2012, entitled "Vehicle Application Store for Console"; 13/679,857, filed on Nov. 16, 2012, entitled "Sharing Applications/Media Between Car and Phone (Hydroid)"; 13/679,878, filed on Nov. 16, 2012, entitled "In-Cloud Connection for Car Multimedia"; 13/679,875, filed on Nov. 16, 2012, entitled "Music Streaming"; 13/679,676, filed on Nov. 16, 2012, entitled "Control of Device Features Based on Vehicle State"; 13/678,673, filed on Nov. 16, 2012, entitled "Insurance Tracking"; 13/678,691, filed on Nov. 16, 2012, entitled "Law Breaking/Behavior Sensor"; 13/678,699, filed on Nov. 16, 2012, entitled "Etiquette Suggestion"; 13/678,710, filed on Nov. 16, 2012, entitled "Parking Space Finder Based on Parking Meter Data"; 13/678,722, filed on Nov. 16, 2012, entitled "Parking Meter Expired Alert"; 13/678,726, filed on Nov. 16, 2012, entitled "Object Sensing (Pedestrian Avoidance/Accident Avoidance)"; 13/678,735, filed on Nov. 16, 2012, entitled "Proximity Warning Relative to Other Cars"; 13/678,745, filed on Nov. 16, 2012, entitled "Street Side Sensors"; 13/678,753, filed on Nov. 16, 2012, entitled "Car Location"; 13/679,441, filed on Nov. 16, 2012, entitled "Universal Bus in the Car"; 13/679,864, filed on Nov. 16, 2012, entitled "Mobile Hot Spot/Router/Application Share Site or Network"; 13/679,815, filed on Nov. 16, 2012, entitled "Universal Console Chassis for the Car"; 13/679,476, filed on Nov. 16, 2012, entitled "Vehicle Middleware"; 13/679,306, filed on Nov. 16, 2012, entitled "Method and System for Vehicle Data Collection Regarding Traffic"; 13/679,369, filed on Nov. 16, 2012, entitled "Method and System for Vehicle Data Collection"; 13/679,680, filed on Nov. 16, 2012, entitled "Communications Based on Vehicle Diagnostics and Indications"; 13/679,443, filed on Nov. 16, 2012, entitled "Method and System for Maintaining and Reporting Vehicle Occupant Information"; 13/678,762, filed on Nov. 16, 2012, entitled "Behavioral Tracking and Vehicle Applications"; 13/679,292, filed Nov. 16, 2012, entitled "Branding of Electrically Propelled Vehicles Via the Generation of Specific Operating Output"; 13/679,400, filed Nov. 16, 2012, entitled "Vehicle Climate Control"; 13/840,240, filed on Mar. 15, 2013, entitled "Improvements to Controller Area Network Bus"; 13/678,773, filed on Nov. 16, 2012, entitled "Location Information Exchange Between Vehicle and Device"; 13/679,887, filed on Nov. 16, 2012, entitled "In Car Communication Between Devices"; 13/679,842, filed on Nov. 16, 2012, entitled "Configurable Hardware Unit for Car Systems"; 13/679,204, filed on Nov. 16, 2012, entitled "Feature Recognition for Configuring a Vehicle Console and Associated Devices"; 13/679,350, filed on Nov. 16, 2012, entitled "Configurable Vehicle Console"; 13/679,358, filed on Nov. 16, 2012, entitled "Configurable Dash Display"; 13/679,363, filed on Nov. 16, 2012, entitled "Configurable Heads-Up Dash Display"; and 13/679,368, filed on Nov. 16, 2012, entitled "Removable, Configurable Vehicle Console". The entire disclosures of the applications listed above are hereby incorporated by reference, in their entirety, for all that they teach and for all purposes.

FIELD

The disclosure relates generally to vehicles and particularly to intelligent vehicles.

BACKGROUND

Vehicles are moving progressively towards higher levels of computerization. Most vehicle tasks, functions, and operations are now under computer control or monitored by computational devices. With the coming of the digital age, consumers are demanding more similarity between cellular phones and tablet computers on the one hand vehicle console interactions on the other.

General Motors and Ford, among others, have announced vehicle infotainment systems having more dynamic user interfaces. The CUE™ infotainment system of Cadillac, for example, integrates the vehicle infotainment system with an intelligent user interface having touch and haptic feedback, natural language voice interaction, proximity sensing and buttons and controls to provide a more in-car information, communication navigation, and entertainment while simultaneously simplifying the interaction and tailoring it to the driving experience. Ford has introduced a SYNC™ and MYFORD™ systems offering features similar to CUE™ and also an in-car application store for games and other types of applications. MYFORD™ offers an open architecture allowing developers to build software that will run in customizable displays in web-enabled cars.

Automotive manufacturers, however, have failed to integrate personal electronic devices of occupants, such as smart phones, tablet computers, and laptop computers, with the in-vehicle computational system.

SUMMARY

These and other needs are addressed by the various aspects, embodiments, and/or configurations of the present disclosure. The present disclosure is directed to a vehicle processing module that can more effectively integrate personal computational devices of occupants by using an application framework supporting different software execution environments.

A system can include:

a computing device including:

a first operating system running in a first execution environment on a shared kernel, the first operating system having a first application framework supporting a first application; and a second operating system running concurrently with the first operating system in a second execution environment on the shared kernel, the second operating system having a second application framework supporting a second application, wherein the second application is incompatible with the first application framework.

The first operating system can include a first set of user libraries in the first execution environment. Typically, the second application is incompatible with the first set of user libraries.

The shared kernel can be running on a first processor of the computing device.

The computing device can be one of a mobile computing device, a tablet computer, a laptop computer, a personal computer, and a processing module of a vehicle.

The system can further include a secondary terminal environment, with the second operating system being associated with the secondary terminal environment.

The system can further include a secondary terminal environment.

The computing device and the secondary terminal environment can be connected with a single dock connector that includes a display interface and serial communications interface.

The computing device can further include a physical memory device.

The first operating system can be associated with a first frame buffer in the physical memory device, and the second operating system with a second frame buffer in the physical memory device.

The computing device can further include a first display device, and the first frame buffer can be associated with the first display device.

The computing device can further include a secondary terminal environment. The secondary terminal environment can include a second display device, and the second frame buffer can be associated with the second display device.

The second application can be displayed on the second display device through the second frame buffer.

The computing device can further include a physical storage device, and the second execution environment can be logically isolated from the first execution environment on the physical storage device.

The computing device can further include an input device connected to the computing device. Input commands from the input device can be available to the first operating system in the first execution environment and to the second operating system in the second execution environment.

The first operating system can be one of a mobile operating system and a desktop operating system, and the second operating system the other of a mobile operating system and desktop operating system.

The second operating system can access input commands from the input device through the shared kernel.

The computing device can be configured using a boot process that includes the steps of:

starting, in response to a power on event, a boot loader;

establishing, by the boot loader, the first execution environment;

starting, by the boot loader, the shared kernel;

initializing, by the shared kernel, the first operating system;

starting, by the shared kernel, the first application framework;

starting, in the first operating system, a first monitor service;

establishing, by the first monitor service, a second execution environment within the first execution environment; and starting, by the first monitor service, the second application framework.

A multi-operating system manager can select a processing resource from among a plurality of processing resources to execute first and second operating systems, the first operating system being a native operating system of the selected processing resource and the second operating system being a native operating system of a second processing resource, and execute, by the second operating system, an application on the selected processing resource and providing the results to the second processing resource for presentation to a user. By way of example, a tablet computer can execute a tablet computer operating system and a mobile operating system. A mobile application can be executed on the mobile operating system in the tablet computer, and the results provided, over a network link, to a mobile computing device having the mobile operating system as its native operating system.

The present disclosure can provide a number of advantages depending on the particular aspect, embodiment, and/or configuration. The first operating system, when on the vehicle processing module, can provide a more dynamic user interface. It can integrate personal electronic devices of occupants, such as smart phones, tablet computers, and laptop computers, with the in-vehicle computational system. For example, occupants can execute a first application on a mobile computing device or personal computing device and, after entering the vehicle cause the user interface to appear on the vehicle console. Occupants can, alternatively, execute a first application on the vehicle processing module and cause the vehicle console user interface to appear on a mobile computing device or personal computing device of the occupant. The occupant can execute applications from one computational device on another computational device. For instance, a mobile application can execute on the personal computing device or vehicle processing module operating system, a personal computing device application can execute on the mobile computing device or vehicle processing module operating system, and a vehicle infotainment application can execute on the mobile computing device or personal computing device operating system.

These and other advantages will be apparent from the disclosure.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "application" refers to application software, also known as an application or an "app", is computer software designed to help the user to perform specific tasks. Examples include satellite location and navigation software, social networking software, gaming software, word processing software, graphics software, and media players. Application software is contrasted with system software and middleware, which manage and integrate a computer's capabilities, but typically do not directly apply in the performance of tasks that benefit the user. The system software serves the application, which in turn serves the user.

The term "application store" refers to a digital application distribution platform that allows users to browse and download applications from an online store. Applications are available either for free or at a cost. Applications can be downloaded directly to a target device.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "automotive navigation system" or "navigation system" is a satellite navigation system designed for use in automobiles. It typically uses a GPS navigation device to acquire position data to locate the user on a road in the unit's map database. Using the road database, the unit can give directions to other locations along roads also in its database. Dead reckoning using distance data from sensors attached to the drivetrain, a gyroscope and an accelerometer can be used for greater reliability, as GPS signal loss and/or multipath can occur due to urban canyons or tunnels.

The terms "communication device," "smartphone," "computing device", and "mobile device," and variations thereof, as used herein, are used interchangeably and include any type of device capable of communicating with one or more of another device and/or across a communications network, via a communications protocol, and the like. Exemplary communication devices may include but are not limited to smartphones, handheld computers, laptops, netbooks, notebook computers, subnotebooks, tablet computers, scanners, portable gaming devices, phones, pagers, GPS modules, portable music players, and other Internet-enabled and/or network-connected devices.

The term "computer-readable medium" as used herein refers to any storage and/or transmission medium that participate in providing instructions to a processor for execution. Such a computer-readable medium is commonly tangible and non-transient and can take many forms, including but not limited to, non-volatile media, volatile media, and transmission media and includes without limitation random access memory ("RAM"), read only memory ("ROM"), and the like. Non-volatile media includes, for example, NVRAM, or magnetic or optical disks. Volatile media includes dynamic memory, such as main memory. Common forms of computer-readable media include, for example, a floppy disk (including without limitation a Bernoulli cartridge, ZIP drive, and JAZ drive), a flexible disk, hard disk, magnetic tape or cassettes, or any other magnetic medium, magneto-optical medium, a digital video disk (such as CD-ROM), any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored. Computer-readable storage medium commonly excludes transient storage media, particularly electrical, magnetic, electromagnetic, optical, magneto-optical signals.

The terms "dash" and "dashboard" and variations thereof, as used herein, are used interchangeably and include any panel and/or area of a vehicle disposed adjacent to an operator, user, and/or passenger. Typical dashboards may include but are not limited to one or more control panel, instrument housing, head unit, indicator, gauge, meter, light, audio equipment, computer, screen, display, HUD unit, and graphical user interface.

The term "desktop environment" is used to refer to a style of GUI through which the user interfaces with the OS using icons, windows, toolbars, folders, and/or desktop widgets, and is not limited to a personal computer OS. For example, a mobile OS could have a desktop device environment, referring to the look and feel of the mobile OS GUI.

The terms "determine", "calculate" and "compute," and variations thereof, as used herein, are used interchangeably and include any type of methodology, process, mathematical operation or technique.

The term "digital distribution" (also called content delivery, online distribution, electronic software distribution (ESD), among others) refers to the delivery of media content such as audio, video, software and video games without the use of physical media usually over online delivery mediums, such as the Internet. The term online distribution is typically applied to freestanding products; downloadable add-ons for other products are more commonly known as downloadable content. An online service for distribution of application software is usually called an "application store" or "app store". Content distributed online may be streamed or downloaded. Streaming involves downloading and using content "on-demand" as it is needed. Meanwhile, downloading content to a hard drive or other form of storage media allows for quick access in the future. Specialist networks known as content delivery networks help distribute digital content over the Internet by ensuring both high availability and high performance. Alternative technologies for content delivery include peer-to-peer file sharing technologies. Content delivery platforms create and syndicate content remotely, acting like hosted content management systems.

The term "display" refers to a portion of a screen used to display the output of a computer to a user.

The term "displayed image" refers to an image produced on the display. A typical displayed image is a window or desktop. The displayed image may occupy all or a portion of the display.

The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

The term "module" as used herein refers to any known or later developed hardware, software, firmware, artificial intelligence, fuzzy logic, or combination of hardware and software that is capable of performing the functionality associated with that element. Also, while the disclosure is presented in terms of exemplary embodiments, it should be appreciated that individual aspects of the disclosure can be separately claimed.

The term "satellite positioning system receiver" refers to a wireless receiver or transceiver to receive and/or send location signals from and/or to a satellite positioning system, such as the Global Positioning System ("GPS") (US), GLONASS (Russia), Galileo positioning system (EU), Compass navigation system (China), and Regional Navigational Satellite System (India).

The term "screen," "touch screen," or "touchscreen" refers to a physical structure that enables the user to interact with the computer by touching areas on the screen and provides information to a user through a display. The touch screen may sense user contact in a number of different ways, such as by a change in an electrical parameter (e.g., resistance or capacitance), acoustic wave variations, infrared radiation proximity detection, light variation detection, and the like. In a resistive touch screen, for example, normally separated conductive and resistive metallic layers in the screen pass an electrical current. When a user touches the screen, the two layers make contact in the contacted location, whereby a change in electrical field is noted and the coordinates of the contacted location calculated. In a capacitive touch screen, a capacitive layer stores electrical charge, which is discharged to the user upon contact with the touch screen, causing a decrease in the charge of the capacitive layer. The decrease is measured, and the contacted location coordinates determined. In a surface acoustic wave touch screen, an acoustic wave is transmitted through the screen, and the acoustic wave is disturbed by user contact. A receiving transducer detects the user contact instance and determines the contacted location coordinates.

"Utility software" is system software designed to help analyze, configure, optimize and/or maintain a computer. Utility software usually focuses on how the computer infrastructure (including the computer hardware, operating system, application software and data storage) operates.

The term "vehicle" refers to a device or structure for transporting animate and/or inanimate or tangible objects (e.g., persons and/or things), such as a self-propelled conveyance. The term "vehicle" as used herein includes any conveyance, or model of a conveyance, where the conveyance was originally designed for the purpose of moving one or more tangible objects, such as people, animals, cargo, and the like. The term "vehicle" does not require that a conveyance moves or is capable of movement. Typical vehicles may include but are in no way limited to cars, trucks, motorcycles, busses, automobiles, trains, railed conveyances, boats, ships, marine conveyances, submarine conveyances, aircraft, space craft, flying machines, human-powered conveyances, and the like.

The term "window" refers to a, typically rectangular, displayed image on at least part of a display that contains or provides content different from the rest of the screen. The window may obscure the desktop.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below.

BRIEF DESCRIPTION OF THE DRAWINGS

Embodiments of the present disclosure are illustrated in referenced figures of the drawings, in which like numbers refer to like elements throughout the description of the figures.

DETAILED DESCRIPTION

Overview

Figure 1:
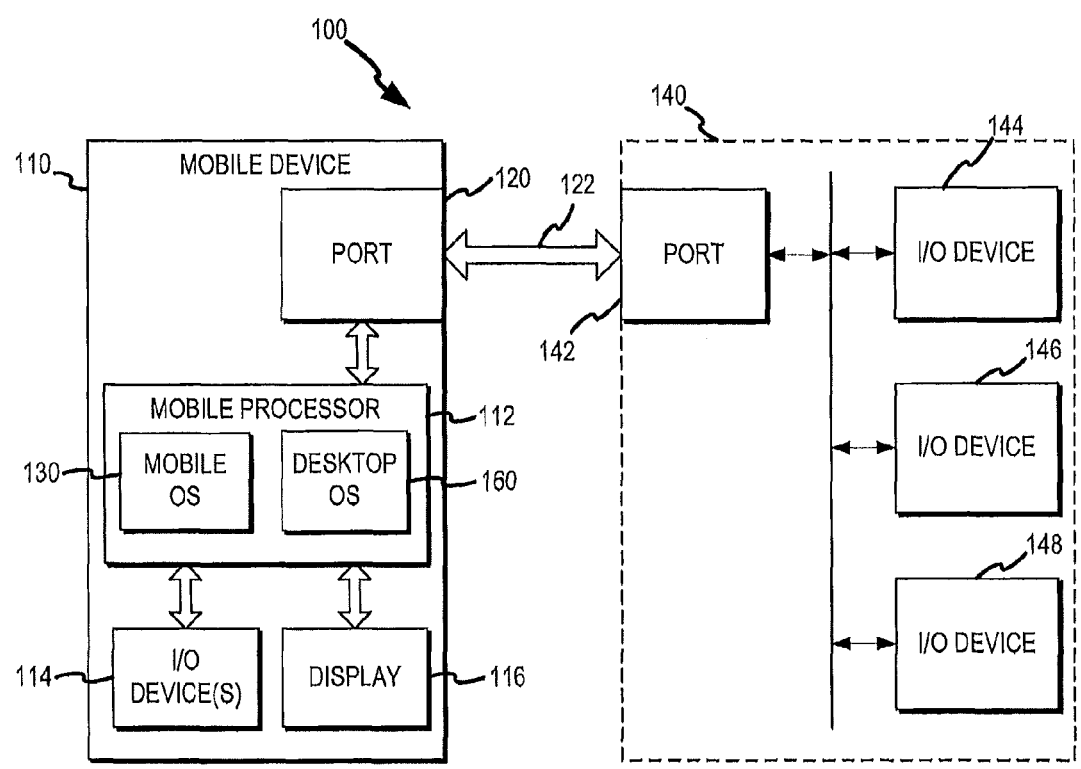
FIG. 1 illustrates a computing environment that provides multiple user computing experiences, according to various embodiments.

A communication system can provide the mobile computing experience of a smartphone and the appropriate user experience of a secondary terminal environment in a single mobile computing device. A secondary terminal environment may be some combination of visual rendering devices (e.g., monitor or display), input devices (e.g., mouse, touch pad, touch-screen, keyboard, etc.), and other computing peripherals (e.g., HDD, optical disc drive, memory stick, camera, printer, etc.) connected to the computing device by a wired (e.g., USB, Firewire, Thunderbolt, etc.) or wireless (e.g., Bluetooth, WiFi, etc.) connection. In embodiments, a mobile operating system associated with the user experience of the mobile environment and a personal computing device (e.g., laptop, e-reader, personal computer or PC, desktop, or tablet computer) operating system associated with the user experience of the secondary terminal environment are run concurrently and independently on a shared kernel. In other embodiments, a vehicle console operating system associated with the user experience of a vehicle infotainment environment, a mobile operating system associated with the user experience of the mobile environment, and/or a personal computing device operating system associated with the user experience of the secondary terminal environment are run concurrently and independently on a shared kernel.

According to one aspect consistent with various embodiments, a computing device of a computing system, such as in a vehicle processing module, includes a mobile operating system with a first application framework supporting a first application running in a first execution environment on a shared kernel. A personal computing device operating system runs concurrently with the mobile operating system in a second execution environment on the shared kernel, the personal computing device operating system includes a second application framework supporting a second application that is incompatible with the first application framework. A vehicle processing module operating system runs concurrently with the mobile operating system in a third execution environment on the shared kernel, the vehicle infotainment operating system includes a third application framework supporting a second application that is incompatible with the first and second application frameworks.

According to other aspects consistent with various embodiments, the second and/or third applications are incompatible with a first set of user libraries of the mobile operating system, the first and/or third applications are incompatible with a second set of user libraries of the personal computing device operating system, and the first and/or second applications are incompatible with a third set of user libraries of the vehicle processing module operating system. In the computing system, the shared kernel may be running on a processor of the mobile computing device, the personal computing device, or the vehicle processing module. The computing system may include primary, secondary and tertiary terminal environments. The mobile computing device operating system may be associated with the primary terminal environment, the personal computing device operating system may be associated with the secondary terminal environment, and the vehicle processing module with the third terminal environment. The personal computing device operating system may be associated with the primary terminal environment, the mobile computing device operating system may be associated with the secondary terminal environment, and the vehicle processing module with the third terminal environment. The vehicle processing module operating system may be associated with the primary terminal environment, the mobile computing device operating system may be associated with the secondary terminal environment, and the personal computing device operating system with the third terminal environment.

The computing device and the secondary and/or third terminal environment(s) may be connected with a single or multiple dock connector(s) each of which includes a display interface and serial communications interface.

The mobile operating system may be associated with a first frame buffer in a physical memory device of the computing device, the personal computing device operating system may be associated with a second frame buffer in the physical memory device, and the vehicle processing module operating system may be associated with a third frame buffer in the physical memory device. The first frame buffer may be associated with a first display device of the computing device.

The personal computing device operating system may be associated with a first frame buffer in a physical memory device of personal computing device, the mobile computing device operating system may be associated with a second frame buffer in the physical memory device, and the vehicle processing module operating system may be associated with a third frame buffer in the physical memory device. The first frame buffer may be associated with a first display device of the personal computing device.

The vehicle processing module operating system may be associated with a first frame buffer in a physical memory device of vehicle processing module, the mobile computing device operating system may be associated with a second frame buffer in the physical memory device, and the personal computing device operating system may be associated with a third frame buffer in the physical memory device. The first frame buffer may be associated with a first display device of the vehicle processing module.

According to other aspects consistent with various embodiments, the computing system may include a second display device of a secondary terminal environment and the second frame buffer may be associated with the second display device. The second application may be displayed on the second display device through the second frame buffer. The second execution environment may be logically isolated from the first execution environment on a physical storage device. An input device may be connected to the computing device, and input commands from the input device may be available to the mobile operating system in the first execution environment and to the personal computing device or vehicle processing module operating system in the second execution environment. The personal computing device or vehicle processing module operating system may access input commands from the input device through the shared kernel.

According to other aspects consistent with various embodiments, the computing device is configured using a boot process that includes the steps of starting, in response to a power on event, a boot loader, establishing, by the boot loader, the first execution environment, starting, by the boot loader, the shared kernel, initializing, by the shared kernel, the mobile, personal computing device, or vehicle processing module operating system, starting, by the shared kernel, the first application framework, starting, in the mobile, personal computing device, or vehicle processing module operating system, a monitor service for the others of the mobile computing device, personal computing device, and vehicle processing module, establishing, by the r monitor service, a second and/or third execution environment within the first execution environment, and starting, by the monitor service, the second and/or third application framework.

According to other aspects consistent with various embodiments, multiple operating systems may be provided on a single physical processor of a computer by running a first application on a first operating system, the first operating system running on a shared kernel and having a first application framework, and running a second application on a second operating system, the second operating system running concurrently with the first operating system on the shared kernel and having a second application framework, wherein the second application is incompatible with the first application framework.

According to other aspects consistent with various embodiments, a first frame buffer memory associated with the first operating system may be allocated by the shared kernel and a second frame buffer memory associated with the second operating system may be allocated by the shared kernel. The first operating system may render the first application in the first frame buffer memory through the shared kernel, and the second operating system may render the second application in the second frame buffer memory through the shared kernel.

According to other aspects consistent with various embodiments, a computing device includes a computer-readable medium storing instructions for a physical processor. The instructions, when executed, cause the processor to perform steps comprising, running a first operating system in a first execution environment on a shared kernel, the first operating system having a first application framework supporting a first application, and running a second operating system concurrently with the first operating system in a second execution environment on the shared kernel, the second operating system having a second application framework supporting a second application, wherein the second application is incompatible with the first application framework. The second execution environment may comprise a chrooted environment. The computing device may include telephony capabilities. The computing device may be, for example, a smartphone.

The Multi-Operating System

Traditionally, handheld mobile telephony devices (i.e., "handsets") were developed independently and served a separate and distinct purpose from that of personal computing devices ("PCs") such as desktops, tablet computers, and laptops. Handheld mobile telephony devices were focused primarily on communication while PCs were focused on computing tasks such as creating and editing documents, text-based communication (e.g., email, etc.), multimedia, and web browsing. However, mobile telephony devices are including ever-increasing computing ability and users increasingly desire convergence of communication and computing capabilities into multi-use mobile devices.

For example, mobile telephony devices called "smartphones" that include computing capabilities are increasing in popularity. Many of these smartphones include a mobile operating system ("OS") running on a mobile processor. While mobile processors and mobile OS's have increased the capabilities of these devices, smartphones have not tended to replace PC environments such as desktop or notebook computers at least because of the limited user experience provided. In particular, for some tasks such as typing or editing documents, a full-size keyboard and large display are easier to use than the user interface components typically found on a smartphone. For example, smartphones typically use a small thumb-style QWERTY keyboard, touch-screen display, click-wheel, and/or scroll-wheel as user interface components. Selecting menu options or items typically involves either using a touch-screen display, or using the click-wheel or scroll-wheel to navigate menus and select items. This interface is suited to the small display screens and limited menu options typically found in smartphones, but not suited to controlling more traditional programs with a larger number of menu options, larger screen area, and user interface built around a pointing device such as a traditional mouse.

Embodiments of the present disclosure are directed to a single mobile computing device that provides the mobile computing experience of a smartphone, and, when docked to a secondary terminal environment, provides a full user experience appropriate to the secondary terminal environment. A secondary terminal environment may be some combination of visual rendering devices (e.g., monitor or display), input devices (e.g., mouse, touch pad, touch-screen, keyboard, etc.), and other computing peripherals (e.g., HDD, optical disc drive, memory stick, camera, printer, etc.) connected to the computing device by wired (e.g., USB, Firewire, Thunderbolt, etc.) or wireless (e.g., Bluetooth, WiFi, etc.) interfaces. For example, secondary terminal environments may include a docking cradle that connects the mobile computing device to an external display and input devices ("Smartdock"), or integrated device that includes a display, keyboard, and pointing device in a laptop-like enclosure ("Smartbook"). Other secondary terminal environments may include a TV, monitor, projector, in-dash car console, home entertainment system, and/or home automation control system. While secondary terminal environments may have some processing or logic elements such as a microcontroller or other application specific integrated circuits ("ASICs"), they typically do not have a processor that runs a separate instance of an operating system.

Other embodiments of the present disclosure are directed to a personal computing device that provides the computing experience of a personal computing device, and, when docked to a secondary terminal environment, provides a full user experience appropriate to the secondary terminal environment. A secondary terminal environment may be for example a mobile computing device or vehicle processing module. Secondary terminal environments may include a docking cradle that connects the personal computing device to an external display and input devices, or integrated device that includes a display, keyboard, and pointing device in a laptop-like enclosure. Other secondary terminal environments may include a mobile computing device, TV, monitor, projector, in-dash car console, home entertainment system, and/or home automation control system. While secondary terminal environments may have some processing or logic elements such as a microcontroller or other application specific integrated circuits ("ASICs"), they typically do not have a processor that runs a separate instance of an operating system.

Other embodiments of the present disclosure are directed to a vehicle processing module that provides the computing experience of a vehicle processing module, and, when docked to a secondary terminal environment, provides a full user experience appropriate to the secondary terminal environment. A secondary terminal environment may be for example a mobile computing device or personal computing device. Secondary terminal environments may include a docking cradle that connects the vehicle processing module to an external display and input devices, or integrated device that includes a display, keyboard, and pointing device in a laptop-like enclosure. Other secondary terminal environments may include a mobile computing device, TV, monitor, projector, personal computing device, home entertainment system, and/or home automation control system. While secondary terminal environments may have some processing or logic elements such as a microcontroller or other application specific integrated circuits ("ASICs"), they typically do not have a processor that runs a separate instance of an operating system.

While the multi-operating system is discussed below in connection with the operating system of the mobile computing device being the primary operating system, it is to be understood that the discussion applies equally to either the personal computing device or vehicle processing module being the primary operating system.

FIG. 1 illustrates a computing environment 100 that provides multiple user computing experiences, according to various embodiments. Computing environment 100 includes mobile computing device 110. Mobile computing device 110 includes mobile computing hardware and software components. Hardware components of mobile computing device 110 include mobile processor 114, display 116, I/O device(s) 118, and/or port 120. Software components of mobile computing device 110 include a first OS 130 and a second OS 160. In one embodiment, first OS 130 is a mobile OS and second OS 160 is a personal computing device or vehicle processing module OS. When mobile computing device 110 is operated as a stand-alone mobile device, mobile OS 130 presents a typical mobile computing user experience through display 116 and I/O device(s) 118. The mobile computing experience provided by mobile OS 130 typically includes mobile telephony capabilities and a graphical user interface ("GUI") suited to the mobile environment including display 116 and I/O device(s) 118. For example, display 116 may be a touch-screen display and application programs (i.e., "Apps") running on mobile OS 130 may be controlled through the GUI of mobile OS 130 on touch-screen display 116.

Mobile computing device 110 may be connected to I/O devices 144, 146 and/or 148 through port 120. I/O devices 144, 146, and/or 148 may make up a secondary terminal environment 140. In some instances, secondary terminal environment 140 may be more suited to personal computing device or vehicle processing module OS 160 than mobile OS 130. For example, secondary terminal environment 140 may include a keyboard 144, pointing device 146, and a display device 148. In these instances, personal computing device or vehicle processing module OS 160 can be associated with secondary terminal environment 140 to provide the full capabilities of a personal computer or vehicle infotainment environment through secondary terminal environment 140. In other instances, secondary terminal environment 140 may be more suited for mobile OS 130 than personal computing device or vehicle processing module OS 160. For example, secondary terminal environment 140 may include a touch-screen display. In these instances, mobile OS 130 may be associated with secondary terminal environment 140.

In FIG. 1, port 120 is shown as connected to port 142 of secondary terminal environment 140 through interface 120. However, port 120 may include separate connections to each I/O device 144, 146 and 148 through interface 122. Interface 122 may be any suitable wired or wireless interface or combination of wired and wireless interfaces for connecting devices such as keyboards, monitors, pointing devices, etc. For example, interface 122 may be a combination of a display interface (e.g., VGA, DVI, HDMI, etc.) and a device communications interface (e.g., USB, Bluetooth, Firewire, other serial communications interface, etc.). Alternatively, interface 122 may be a single communications interface that supports both video and device communications signals (e.g., Thunderbolt, etc.).

Traditionally, the hardware and software development paths for the handset environment and the PC environment have been completely independent because of different use models and competing constraints on product design. PCs, including personal computing devices, are designed to be flexible and powerful. Specifically, PC hardware architecture is typically based around a general purpose PC processor connected to memory, graphics, and external components through various general purpose interfaces on a motherboard. For example, a personal computing device motherboard may include a processor connected through a logic chipset to a graphics processor, system memory (e.g., RAM), and various other components through communication interfaces (PCI, USB, ISA, IDE, etc.). Some more highly integrated PC processors include an interface to a graphics processor (e.g., AGP, etc.) and/or interface to system memory (e.g., SDR, DDR, DDR2, DDR3, DRDRAM, etc.) on the processor.

PC processors are optimized for high processor clock speed and computationally intensive tasks. The personal computing device market is presently dominated by processors based on the x86 CPU architecture. Current x86-based PC processors for personal computing devices have multiple 64-bit central processing units ('CPUs") (or "cores") with clock speeds exceeding 2.5 GHz and power consumption approaching 100 Watts. Current x86-based PC processors for laptop computers typically run at clock speeds up to 2.0 GHz and have power consumption in the range of 15-45 Watts. Because of the large power consumption of these processors, personal computing devices may require cooling devices such as fans or heat-sinks to remove waste heat from the processor. In addition, the battery life of laptop computers using x86-based PC processors is typically less than four hours.

In contrast, mobile processors for handsets are optimized for low power consumption and a high level of integration to reduce the overall size of the handset. For example, mobile processors for handsets such as smartphones typically run at clock speeds lower than 2.0 GHz, have power consumption of less than 1 Watt, and integrate functions common to the mobile environment such as graphics controllers, communications interfaces, and camera controllers. The most common mobile processor architectures are reduced instruction set computing ("RISC") processor architectures. Specifically, the "ARM" mobile processor architecture is currently the predominant architecture for mobile processors designed for smartphones and other ultra-portable and low power computing devices. Some PC processor manufacturers also refer to PC processors designed for use in laptop computers as "mobile processors." However, as used herein, the term "mobile processor" refers to a processor suited for use in a handset or smartphone, typically consuming less than 1 Watt and integrating mobile functionality.

Personal computing devices and handsets also typically have different system resources, input/output ("I/O") devices, and peripherals. For example, portable computers and vehicle processing modules typically have much larger amounts of system memory and storage capacity than handsets. While a typical laptop computer may have more than 2 GB of RAM and a hard-drive with a capacity of more than 250 GB, handsets typically have less than 512 MB of RAM and a solid-state drive with a capacity of less than 32 GB. User interface components of personal computing devices typically include a display screen larger than 9 inches diagonally, a full keyboard, and pointing device(s) for user input. In contrast, handsets typically include a display screen smaller than 7 inches diagonally and user interface components such as a thumb-style QWERTY keyboard, touch-screen display, click-wheel, and/or scroll-wheel. Peripherals found on personal computing devices typically include an optical disk drive (e.g., CD, DVD, DVD-RW, etc.), expansion ports (e.g., PCMCIA, SCSI, Express Card, etc.), video output port (e.g., VGA, DVI, HDMI, etc.), and generic device ports (e.g., USB, etc.). In contrast, handsets typically do not have optical disk drives or expansion ports. However, other devices are typically integrated into handsets including wireless communications interface(s) (e.g., GSM, CDMA, LTE, EDGE, WiFi, WiMax, etc.), GPS chipset, accelerometer, camera(s), and/or solid-state memory port (SD, Memory Stick, etc.).

Software for personal computing devices and handsets has also traditionally been developed independently. For example, portable computers and vehicle processing modules typically run different operating systems than mobile devices. An operating system is software that manages computer hardware and resources and provides common services for execution of applications software on the computer hardware. Operating systems are generally described as having various abstraction layers, where each layer interfaces with the layer below through an interface.

Generally, the kernel of an operating system refers to the core as layer that manages the computing devices resources such as the CPU(s) (CPU scheduling), memory, and I/O (including peripheral and file system access). A kernel will usually provide features for low-level scheduling of processes (dispatching), inter-process communication, process synchronization, context switching, manipulation of process control blocks, interrupt handling, process creation and destruction, and process suspension and resumption. The OS kernel may or may not include device drivers. Other layers of the OS interface with the kernel through system calls or an application programming interface ("API") layer.

Generally, other OS layers include the libraries layer, application framework layer, and application layer. The libraries layer typically includes system libraries and other user libraries. The application framework layer includes services, managers, and runtime environments. The application layer includes user applications, which may run within a runtime environment of the application framework layer. A user interacts with the OS through the OS GUI. The GUI presents menus, buttons, and controls that the user selects to control and use applications running on the OS. Commonly, the term "personal computing device environment" is used to refer to a style of GUI through which the user interfaces with the OS using icons, windows, toolbars, folders, and/or desktop widgets, and is not limited to a portable computer OS. For example, a mobile OS could have a personal computing device environment, referring to the look and feel of the mobile OS GUI.

Operating systems for personal and portable computers (personal computing device OSs) were designed for multi-tasking, larger screen areas, and to provide a flexible environment for application developers. As used herein, the term "personal computing device operating system" refers to an operating system designed for use with a personal computing device environment, for example a personal computing device or laptop use environment. Examples of personal computing device OS's include various distributions of Linux, Mac OS X, and Windows 7, among many others.

Operating systems for mobile devices (mobile OSs) were developed for the smaller screen area, lower processing power, smaller memory, and smaller disk space typically found on handsets and smartphones. Example mobile OSs include Android, Apple's iOS (for the iPhone and iPad), Microsoft's Windows Mobile (superseded by Windows Phone 7), Nokia's Symbian, and Palm's Palm OS (superseded by HP webOS). As used herein, the term mobile OS refers to an operating system designed for use with a mobile environment including running on a low-power processor with reduced system resources compared to the PC environment (i.e., personal computing device system).

Mobile operating systems generally have a particular application development environment that is used to create application programs (i.e., "apps") that run on the mobile OS. The application development environment both facilitates application development by providing common tools and APIs for accessing system resources and services, and limits what applications are allowed to do such that the mobile device is able to continue to provide other required functions. For example, incoming phone calls and texts may interrupt a running application to notify the user of the incoming call or text.

The most widely adopted mobile OS is Google's Android. While Android is based on Linux, it includes modifications to the kernel and other OS layers for the mobile environment and mobile processors. In particular, while the Linux kernel is designed for the x86 CPU architecture, the Android kernel is modified for ARM-based mobile processors. Android device drivers are also particularly tailored for devices typically present in a mobile hardware architecture including touch-screens, mobile connectivity (GSM/EDGE, CDMA, Wi-Fi, etc.), battery management, GPS, accelerometers, and camera modules, among other devices.

In Android, applications run within the Dalvik virtual machine on an object-oriented application framework designed specifically for the memory and processor speed constraints of mobile hardware architectures. Applications are developed for the Dalvik virtual machine through the Android SDK. In addition, Android does not have a native X Window System nor does it support the full set of standard GNU libraries, and this makes it difficult to port existing GNU/Linux applications or libraries to Android.

Apple's iOS operating system (run on the iPhone) and Microsoft's Windows Phone 7 are similarly modified for the mobile environment and mobile hardware architecture. For example, while iOS is derived from the Mac OS X personal computing device OS, common Mac OS X applications do not run natively on iOS. Specifically, applications are developed for iOS through an SDK to run within the "Cocoa Touch" runtime environment of iOS, which provides basic application infrastructure and support for key iOS features such as touch-based input, push notifications, and system services. Therefore, applications written for Mac OS X do not run on iOS without porting them through the iOS SDK. In addition, it may be difficult to port Mac OS X applications to iOS because of differences between user libraries and application framework layers of the two OSs, and differences in system resources of the mobile and personal computing device or processing module hardware.

Because of the differences in processing requirements, system resources, and application development, applications developed for personal computing device and vehicle processing module OSs typically do not run on mobile OSs. Additionally, personal computing device and vehicle processing module applications may not be easily ported to mobile OSs because they are commonly optimized for a larger screen area, more processing speed, more system memory, different libraries, and commonly a different GUI. As a result, users typically use separate computing devices for each user environment, including a smartphone, tablet computer, laptop computer, and/or desktop computer. In this instance, each device has its own CPU, memory, file storage, and OS.

Connectivity and file sharing between smartphones and other devices involves linking one device (e.g., smartphone, running a mobile OS) to a second, wholly disparate device (e.g., notebook, desktop, or tablet running a personal computing device or vehicle processing module OS), through a wireless or wired connection. Information is shared across devices by synchronizing data between applications running separately on each device. This process, typically called "synching," is cumbersome and generally requires active management by the user.

Recently, some attempts have been made to provide a more complete user experience with a single mobile computing device. For example, a smartphone may be connected to an external monitor and input devices such as a full keyboard to provide a more personal computing device-like user experience, with the mobile OS graphical user interface extended to the larger screen and accepting input from the input devices. However, because the external monitor and input devices are only an extension of the smartphone's operating system and user interface, the capabilities of the docked environment are limited by the smartphone's mobile OS. For example, many software applications available on portable computer or vehicle processing module OSs are not available or have limited functionality on mobile computing device OSs. Accordingly, these devices do not present a full personal computing device or processing module user experience when connected to an external environment.

Referring still to FIG. 1, computing environment 100 provides multiple user computing experiences without the above limitations. Specifically, because mobile computing device 110 includes multiple OSs, where each OS is suited to a particular computing environment, mobile computing device 110 may be adapted with external devices to provide a broad range of user experiences with a single mobile computing device. For example, a user may have a mobile computing device 110 and a secondary terminal environment 140 that provides the user experience of a personal computing device or vehicle processing module when connected to mobile computing device 110. In this instance, personal computing device or processing module OS 160 of the mobile computing device is associated with the secondary terminal environment 140 when the secondary terminal environment is connected to mobile computing device 110. To the user, the full capabilities of personal computing device or vehicle processing module as 160 are available through secondary terminal environment 140.

Figure 2:
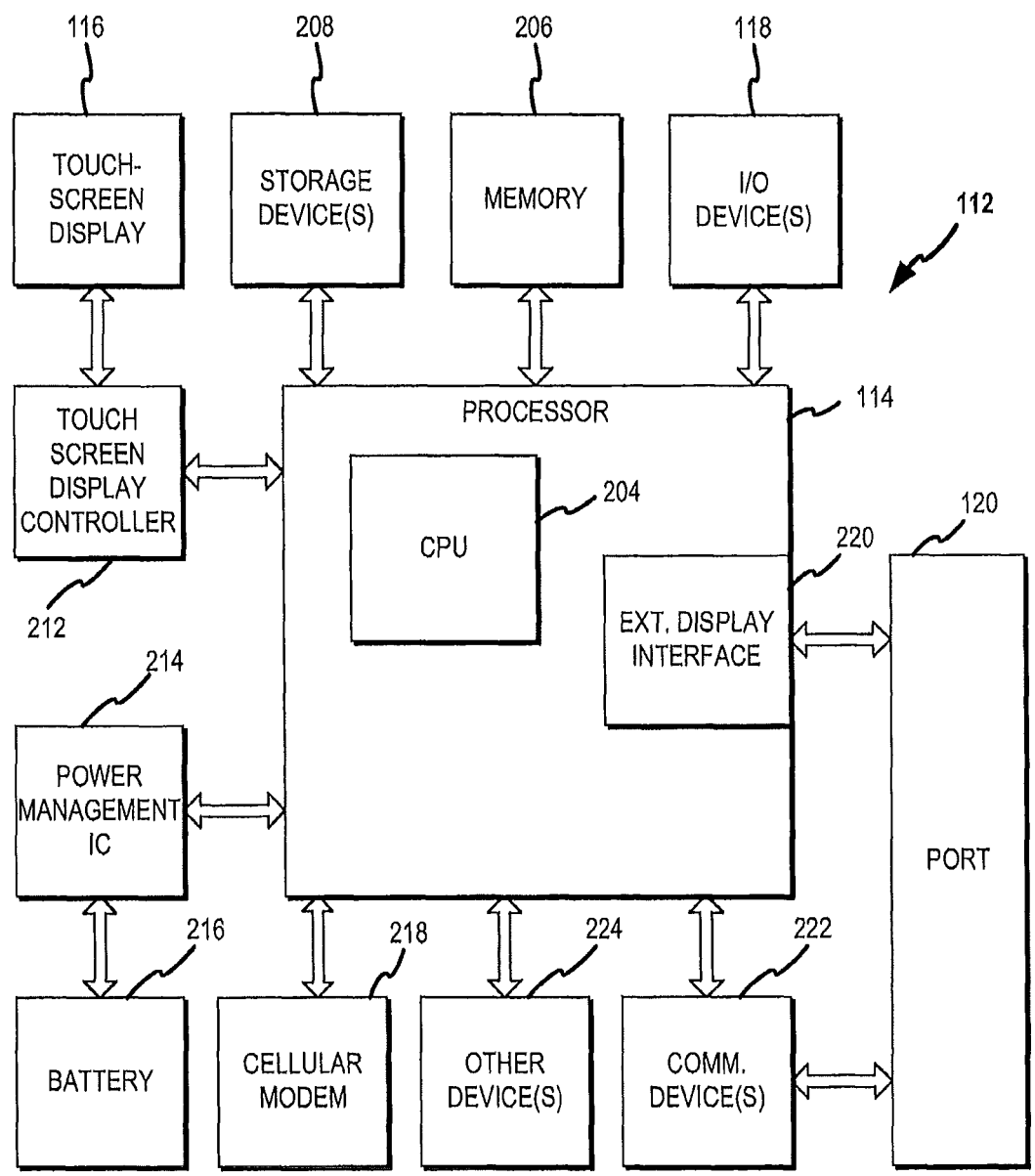
FIG. 2 illustrates an exemplary system architecture for a mobile computing device, according to various embodiments.

FIG. 2 illustrates an exemplary hardware system architecture for mobile computing device 110, according to various embodiments. Mobile computing device hardware 112 includes mobile processor 114 that includes one or more CPU cores 204 and external display interface 220. Generally, mobile computing device hardware 112 also includes I/O device(s) 118, memory 206, storage device(s) 208, touch-screen display controller 210 connected to touch-screen display 116, power management IC 214 connected to battery 216, cellular modem 218, communication device(s) 222, and/or other device(s) 224 that are connected to processor 114 through various communication signals and interfaces. I/O device(s) 118 generally includes buttons and other user interface components that may be employed in mobile computing device 110. For example, I/O device(s) 118 may include a set of buttons, (e.g., back, menu, home, search, etc.), off-screen gesture area, click-wheel, scroll-wheel, QWERTY keyboard, etc. Other device(s) 224 may include, for example, GPS devices, LAN connectivity, microphones, speakers, cameras, accelerometers, and/or MS/MMC/SD/SDIO card interfaces. External display interface 220 may be any suitable display interface (e.g., VGA, DVI, HDMI, etc.).

Processor 114 may be an ARM-based mobile processor. In embodiments, mobile processor 114 is a mobile ARM-based processor such as Texas Instruments OMAP3430, Marvell PXA320, Freescale iMX51, or Qualcomm QSD8650/8250. However, mobile processor 114 may be another suitable ARM-based mobile processor or processor based on other processor architectures such as, for example, x86-based processor architectures or other RISC-based processor architectures.

While FIG. 2 illustrates one exemplary hardware implementation 112 for mobile computing device 110, other architectures are contemplated as within the scope of the disclosure. For example, various components illustrated in FIG. 2 as external to mobile processor 114 may be integrated into mobile processor 114. Optionally, external display interface 220, shown in FIG. 2 as integrated into mobile processor 114, may be external to mobile processor 114. Additionally, other computer architectures employing a system bus, discrete graphics processor, and/or other architectural variations are suitable for employing aspects of the present disclosure.

Figure 3:
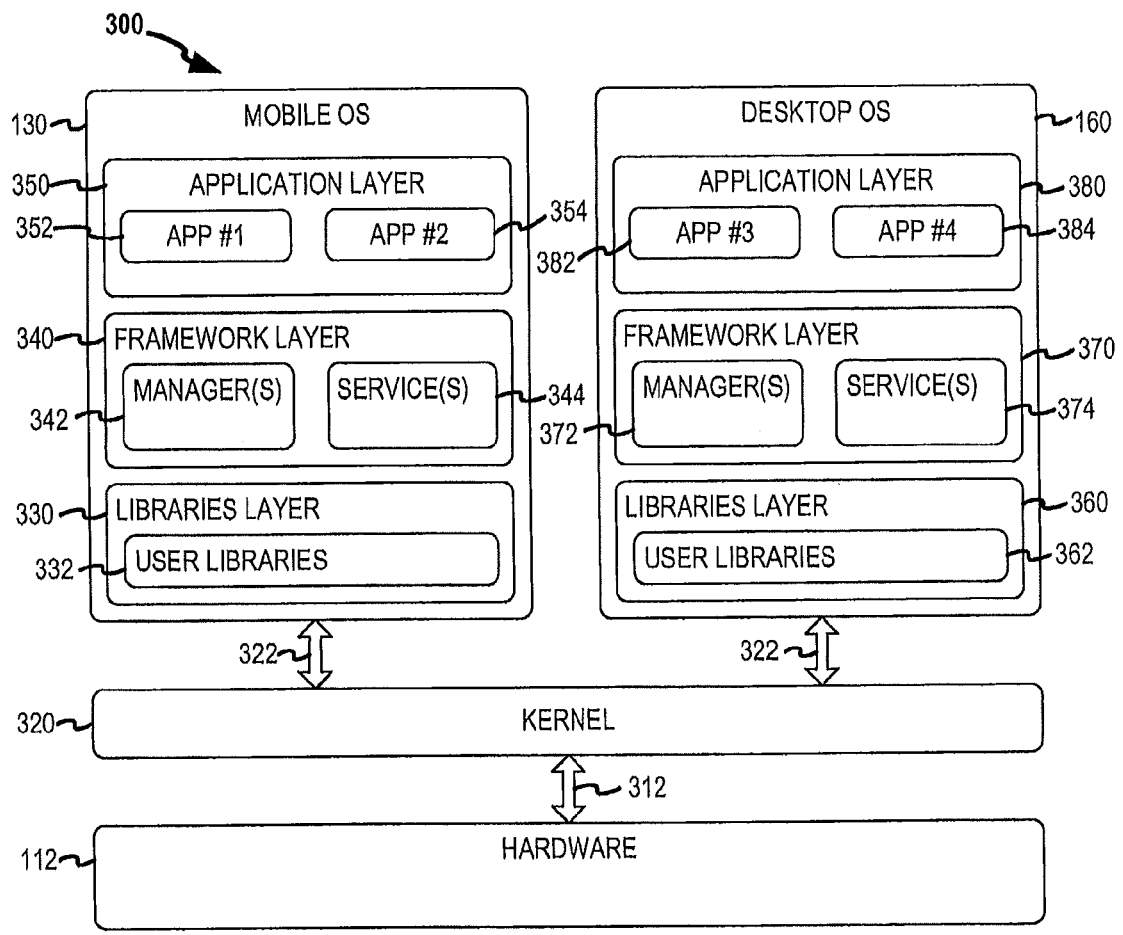
FIG. 3 illustrates an operating system architecture for a computing environment, according to various embodiments.

FIG. 3 illustrates OS architecture 300 that may be employed to run mobile OS 130 and personal computing device or vehicle processing module OS 160 concurrently on mobile computing device 110, according to various embodiments. As illustrated in FIG. 3, mobile OS 130 and personal computing device or vehicle processing module OS 160 are independent operating systems. Specifically, mobile OS 130 and personal computing device or vehicle processing module OS 160 may have independent and incompatible user libraries and/or framework layers. Functions and instructions for OS architecture 300 may be stored as computer program code on a tangible computer readable medium of mobile computing device 110. For example, instructions for OS architecture 300 may be stored in storage device(s) 208 of mobile computing device hardware 112.

As illustrated in FIG. 3, mobile OS 130 has libraries layer 330, application framework layer 340, and application layer 350. In mobile OS 130, applications 352 and 354 run in application layer 350 supported by application framework layer 340 of mobile OS 130. Application framework layer 340 includes manager(s) 342 and service(s) 344 that are used by applications running on mobile OS 130. For example, application framework layer 340 may include a window manager, activity manager, package manager, resource manager, telephony manager, gesture controller, and/or other managers and services for the mobile environment.

Application framework layer 340 may include a mobile application runtime environment that executes applications developed for mobile OS 130. The mobile application runtime environment may be optimized for mobile computing resources such as lower processing power or limited memory space. The mobile application runtime environment may rely on the kernel for process isolation, memory management, and threading support. Libraries layer 330 includes user libraries 332 that implement common functions such as I/O and string manipulation ("standard C libraries"), graphics libraries, database libraries, communication libraries, and/or other libraries.

As illustrated in FIG. 3, personal computing device or vehicle processing module OS 160 has libraries layer 360, framework layer 370, and application layer 380. In personal computing device or vehicle processing module OS 160, applications 382 and 384 run in application layer 380 supported by application framework layer 370 of personal computing device or vehicle processing module OS 160. Application framework layer 370 includes manager(s) 372 and service(s) 374 that are used by applications running on personal computing device or processing module OS 160. For example, application framework layer 370 may include a window manager, activity manager, package manager, resource manager, and/or other managers and services common to a personal computing device or vehicle processing module environment. Libraries layer 360 may include user libraries 362 that implement common functions such as I/O and string manipulation ("standard C libraries"), graphics libraries, database libraries, communication libraries, and/or other libraries.

In various embodiments of the present disclosure, personal computing device or vehicle processing module OS 160 runs in a separate execution environment from mobile OS 130. For example, mobile OS 130 may run in a root execution environment and personal computing device or vehicle processing module OS 160 may run in a secondary execution environment established under the root execution environment. Processes and applications running on mobile OS 130 access user libraries 332, manager(s) 342 and service(s) 344 in the root execution environment. Processes and applications running on personal computing device or vehicle processing module OS 160 access user libraries 362, manager(s) 372 and service(s) 374 in the secondary execution environment.

Generally applications developed for mobile OS 130 do not run directly on personal computing device or vehicle processing module OS 160, and applications developed for personal computing device or vehicle processing module OS 160 do not run directly on mobile OS 130. For example, application 382 running in application layer 380 of personal computing device or vehicle processing module OS 160 may be incompatible with mobile OS 130, meaning that application 382 could not run on mobile OS 130. Specifically, application 382 may use manager(s) 372 and service(s) 374 of application framework layer 370 of personal computing device or vehicle processing module OS 160 that are either not available or not compatible with manager(s) 342 and service(s) 344 in application framework layer 340 in mobile OS 130. In addition, application 382 may attempt to access user libraries 362 that exist in libraries layer 360 of personal computing device or vehicle processing module OS 160 but are either not available or not compatible with user libraries 332 available in libraries layer 330 of mobile OS 130.

In OS architecture 300, mobile OS 130 and personal computing device or vehicle processing module OS 160 run concurrently on shared kernel 320. This means that mobile OS 130 and personal computing device or vehicle processing module OS 160 are running on shared kernel 320 at the same time. Specifically, mobile OS 130 and personal computing device or vehicle processing module OS 160 both interface to shared kernel 320 through the same kernel interface 322, for example, by making system calls to shared kernel 320. Shared kernel 320 manages task scheduling for processes of both mobile OS 130 and personal computing device or vehicle processing module OS 160. In this regard, mobile OS 130 and personal computing device or vehicle processing module OS 160 are running independently and concurrently on shared kernel 320. In addition, shared kernel 320 runs directly on mobile processor 114 of mobile computing device hardware 112, as illustrated by hardware interface 312. Specifically, shared kernel 320 directly manages the computing resources of mobile computing device hardware 112 such as CPU scheduling, memory access, and I/O. In this regard, hardware resources are not virtualized, meaning that mobile OS 130 and personal computing device or vehicle processing module OS 160 make system calls through kernel interface 322 without virtualized memory or I/O access.

There are several techniques for providing multiple OS's on the same computing device. However, none of these techniques provide multiple different OS's running concurrently and independently on a shared kernel. More particularly, none of these techniques provide a solution for a mobile OS and a personal computing device or vehicle processing module OS running on a shared kernel.

In one technique, known as dual-boot, multiple OS's are loaded on the computing device one at a time. For example, at boot time, a user may select one OS from multiple available Oss to be run on the device, where each OS has its own kernel, libraries, framework, and applications. The system then boots up into that operating system and the other OS(s) are not running (i.e., no processes of the other OS(s) are loaded concurrently with the running OS). Therefore, this technique does not run multiple OS's on a shared kernel, nor does this technique run multiple OSs concurrently.

Another technique for running multiple OS's on the same device is to use a Virtual Machine Manager ("VMM"), or "Hypervisor." A VMM or Hypervisor runs directly on the hardware and separates the individual kernels of each OS from the hardware, controlling which computer hardware resources are available to each OS at any given time. A Hypervisor effectively creates multiple virtual machines from one device, such that each OS sees a separate virtual machine. Therefore, multiple OS running on the same device through Hypervisor and VMM are not running on a shared kernel. The Hypervisor adds system overhead due to each OS having to access system resources through virtualization in the Hypervisor. Additionally, because the Hypervisor must allocate CPU and other computing resources, each OS may not be able to effectively schedule processes and tasks.

Yet another technique for running multiple operating systems on the same device is to use a hosted virtual machine. In this technique, each OS has its own kernel, with the kernel of the guest as running on a virtual machine in the host OS. The virtual machine may be a virtualized hardware platform different than the physical hardware platform. The virtual machine in the host as may be implemented in the kernel of the host OS. In this instance, the kernel of the host OS acts as a hypervisor through which the kernel of the guest OS accesses the processor and hardware resources. Regardless of where the virtual machine is implemented in this technique, the host OS and the guest OS have separate kernels. Therefore, hosted virtual machines do not have multiple OSs running on a shared kernel. System performance using this technique may be reduced due to virtualization of hardware resources for the guest OS.

Another form of virtualization is operating system level virtualization. In this technique, multiple isolated user-space instances may be created on the kernel of an operating system, which look like separate OS instances from the point of view of users of each user-space instance. In this technique, the host OS and guest OS(s) must be the same OS. Accordingly, this technique does not provide a solution for a mobile OS and personal computing device or processing module OS running independently and concurrently on a shared kernel. Further, similarly to a hosted virtual machine, this technique uses disk space and memory virtualization for the guest OS(s). Accordingly, this technique does not provide direct access to memory and system resources for each concurrent OS.

These techniques of running multiple OS's have limitations with regard to running both operating systems concurrently and independently. For example, virtualization involves setting up a distinct address space for the guest OS and simulating I/O to the guest OS. Therefore, access to hardware including system memory has higher overhead for the guest OS using virtualization. Additionally, techniques using Hypervisors result in lack of certainty in process control of each OS. Specifically, the Hypervisor manages the amount of CPU time allocated to each OS, and each OS then allocates CPU time for processes within the OS, without knowledge of what is occurring in the other OS. In this regard, high priority processes within one OS may not be given the required CPU time to complete their tasks because the OS is sharing CPU time through the Hypervisor, which cannot account for the relative priorities of processes running within each OS. Because processing power may be limited in mobile processor architectures relative to personal computing device or processing module processor architectures, techniques that depend on virtualization, including hypervisors, and operating system level virtualization, may not offer optimal performance for a personal computing device or processing module as running concurrently with a mobile as on a mobile processor.

Figure 4:
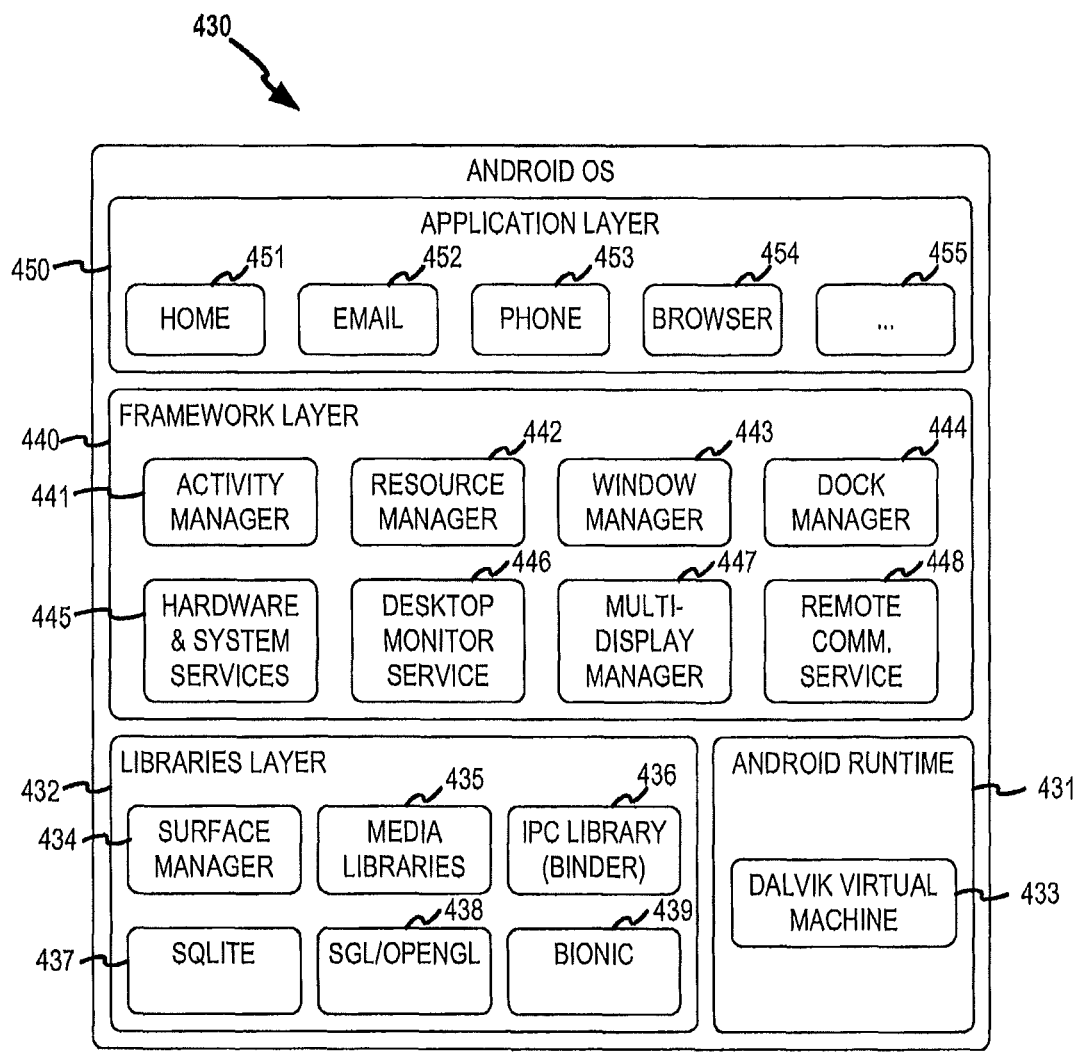
FIG. 4 illustrates aspects of a mobile operating system for a computing environment, according to various embodiments.
Figure 5:
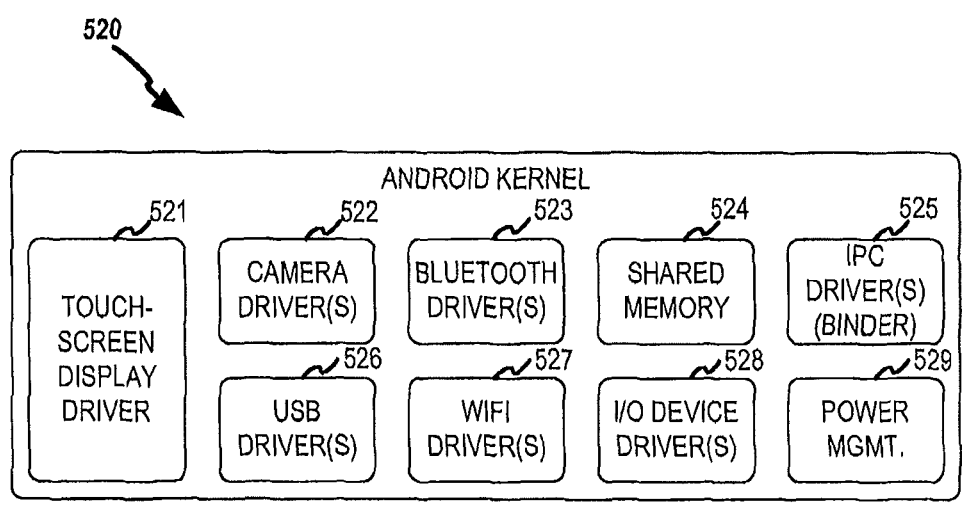
FIG. 5 illustrates aspects of a shared kernel for a computing environment, according to various embodiments.
Figure 6:
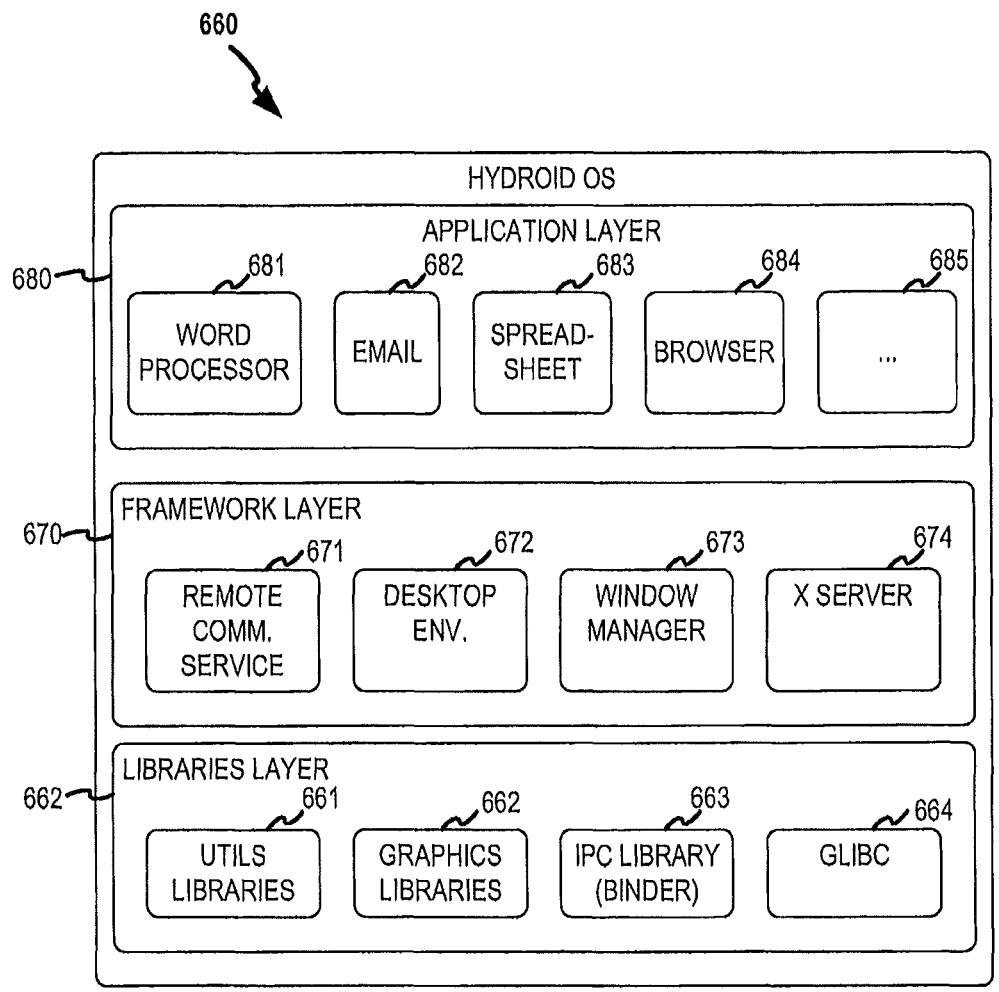
FIG. 6 illustrates aspects of a personal computing device or processing module operating system for a computing environment, according to various embodiments.

In one embodiment consistent with OS architecture 300, an Android mobile OS and a full Linux OS run independently and concurrently on a modified Android kernel. In this embodiment, the Android OS may be a modified Android distribution while the Linux OS ("Hydroid") is a modified Debian Linux personal computing device or processing module OS. FIGS. 4-6 illustrate Android mobile OS 430, Android kernel 520, and Hydroid OS 660 that may be employed in OS architecture 300 in more detail.

As illustrated in FIG. 4, Android OS 430 includes a set of C/C++ libraries in libraries layer 432 that are accessed through application framework layer 440. Libraries layer 432 includes the "bionic" system C library 439 that was developed specifically for Android to be smaller and faster than the "glibc" Linux C-library. Libraries layer 432 also includes inter-process communication ("IPC") library 436, which includes the base classes for the "Binder" IPC mechanism of the Android OS. Binder was developed specifically for Android to allow communication between processes and services. Other libraries shown in libraries layer 432 in FIG. 4 include media libraries 435 that support recording and playback of media formats, surface manager 434 that managers access to the display subsystem and composites graphic layers from multiple applications, 2D and 3D graphics engines 438, and lightweight relational database engine 437. Other libraries that may be included in libraries layer 432 but are not pictured in FIG. 4 include bitmap and vector font rendering libraries, utilities libraries, browser tools (i.e., WebKit, etc.), and/or secure communication libraries (i.e., SSL, etc.).

Application framework layer 440 of Android OS 430 provides a development platform that allows developers to use components of the device hardware, access location information, run background services, set alarms, add notifications to the status bar, etc. Framework layer 440 also allows applications to publish their capabilities and make use of the published capabilities of other applications. Components of application framework layer 440 of Android mobile OS 430 include activity manager 441, resource manager 442, window manager 443, dock manager 444, hardware and system services 445, personal computing device or processing module monitor service 446, multi-display manager 447, and remote communication service 448. Other components that may be included in framework layer 440 of Android mobile OS 430 include a view system, telephony manager, package manager, location manager, and/or notification manager, among other managers and services.

Applications running on Android OS 430 run within the Dalvik virtual machine 431 in the Android runtime environment 433 on top of the Android object-oriented application framework. Dalvik virtual machine 431 is a register-based virtual machine, and runs a compact executable format that is designed to reduce memory usage and processing requirements. Applications running on Android OS 430 include home screen 451, email application 452, phone application 453, browser application 454, and/or other application(s) ("App(s)") 455.

For these reasons, applications written for Android do not generally run on desktop Linux distributions such as Hydroid OS 660 and applications written for standard Linux distributions do not generally run on Android OS 430. In this regard, applications for Android OS 430 and Hydroid OS 660 are not bytecode compatible, meaning compiled and executable programs for one do not run on the other.

FIG. 5 illustrates modified Android kernel 520 in more detail, according to various embodiments. Modified Android kernel 520 includes touch-screen display driver 521, camera driver(s) 522, Bluetooth driver(s) 523, shared memory allocator 524, IPC driver(s) 525, USB driver(s) 526, WiFi driver(s) 527, I/O device driver(s) 528, and/or power management module 529. I/O device driver(s) 528 includes device drivers for external I/O devices, including devices that may be connected to mobile computing device 110 through port 120. Modified Android kernel 520 may include other drivers and functional blocks including a low memory killer, kernel debugger, logging capability, and/or other hardware device drivers.

FIG. 6 illustrates Hydroid OS 660 in more detail, according to various embodiments. Hydroid is a full Linux OS that is capable of running almost any application developed for standard Linux distributions. In particular, libraries layer 662 of Hydroid OS 660 includes Linux libraries that support networking, graphics processing, database management, and other common program functions. For example, user libraries 662 may include the standard Linux C library (glibc) 664, Linux graphics libraries 662 (e.g., GTK, etc.), Linux utilities libraries 661, Linux database libraries, and/or other Linux user libraries. Applications run on Hydroid within an X-Windows Linux graphical environment using X-Server 674, window manager 673, and/or personal computing device or processing module environment 672. Illustrated applications include word processor 681, email application 682, spreadsheet application 683, browser 684, and other application(s) 685.

In one embodiment, Hydroid OS 660 includes components of a cross-environment communication framework that facilitates communication with Android OS 430 through shared kernel 520. These components include IPC library 663 that includes the base classes for the Binder IPC mechanism of the Android OS and remote communications service 671.

In one embodiment, Hydroid OS 660 is run within a chrooted (created with the 'chroot' command) secondary execution environment created within the Android root environment. Processes and applications within Hydroid OS 660 are run within the secondary execution environment such that the apparent root directory seen by these processes and applications is the root directory of the secondary execution environment. In this way, Hydroid OS 660 can run programs written for standard Linux distributions without modification because Linux user libraries 662 are available to processes running on Hydroid OS 660 in the chrooted secondary execution environment.

Figure 7:
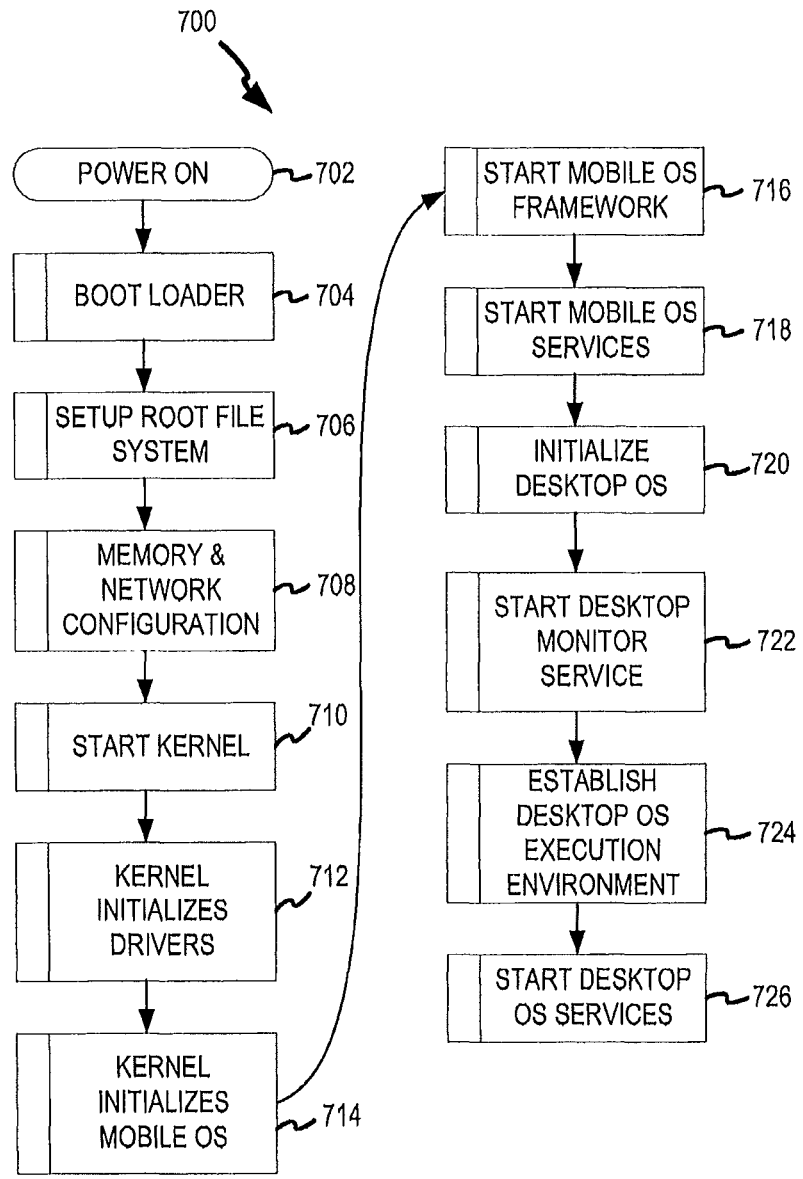
FIG. 7 illustrates an exemplary boot procedure that may be used to configure an operating system architecture of a mobile computing device in more detail, according to various embodiments.

FIG. 7 illustrates an exemplary boot procedure 700 that may be used to boot up the components of OS architecture 300. Boot procedure 700 begins at step 702 when the system is powered on via hardware. For example, the user may turn on mobile computing device 110 via a switch or button.

At step 704, the boot loader is loaded in memory (e.g., RAM) with boot arguments passed from hardware or firmware. At step 706, the boot loader sets up the root file system. At step 708, the boot loader configures the memory and network support. In this step, the boot loader may also configure modem support, low memory protection, and security options. At step 710, the boot loader locates shared kernel 320 and loads it to memory, passing kernel arguments as needed. The boot loader starts shared kernel 320, at which point shared kernel 320 takes over control of the boot procedure. In one embodiment, shared kernel 320 is modified Android kernel 520.

At step 712, shared kernel 320 initializes drivers for hardware devices. In this step, shared kernel 320 may also initialize memory protection, virtual memory modules, and schedule caching. At step 714, shared kernel 320 initializes the mobile OS. In one embodiment, the shared kernel runs a user space initialization process to initialize Android OS 430. The initialization process reads a configuration file which describes system services and additional system parameters for Android OS 430. At step 716, the mobile OS framework is started, this generally includes starting runtime environments. In one embodiment, the root process of Android OS 430, Zygote, is run by the initialization process and initializes the Dalvik Virtual Java Machine runtime environment. At step 718, service(s) 344 for the mobile OS are started. Service(s) 344 for the mobile OS generally include telephony services, camera services, GPS services, and/or communications services. In one embodiment, Zygote starts the main Android SystemServer of Android OS 430 which starts Android services such as telephony, camera, Bluetooth, etc.

At step 720, the personal computing device or processing module OS is initialized. In one embodiment, an initialization process of Android OS 430 parses a second configuration file and executes the commands and runs the services configured in the second configuration file. At step 722, a personal computing device or processing module monitor service is started in the mobile OS that starts and monitors the personal computing device or processing module OS. In one embodiment, personal computing device or processing module monitor service 446 is started in Android OS 430. At step 724, the personal computing device or processing module monitor service establishes a separate execution environment for the personal computing device or processing module OS. In one embodiment, personal computing device or processing module monitor service 446 of Android OS 430 uses the Linux chroot command to setup the separate execution environment within the root file system for Hydroid OS 660. A separate execution environment for the personal computing device or processing module OS allows, for example, the personal computing device or processing module OS to have different user libraries than the mobile OS. In one embodiment, user libraries 662 of Hydroid OS 660 are in a separate execution environment of user libraries 432 of Android OS 430. Specifically, applications and programs in each OS can statically or dynamically link to libraries separately within each OS, without linking conflicts or library compatibility problems. At step 726, the personal computing device or processing module monitor service starts the personal computing device or processing module OS service(s) 374. In one embodiment, this includes the X-Window system 674 and Xfce personal computing device or processing module environment 672 of Hydroid OS 660.

After step 726, mobile OS 130 and personal computing device or processing module OS 160 are running concurrently and independently on shared kernel 320 on mobile computing device 110.

Figure 8:
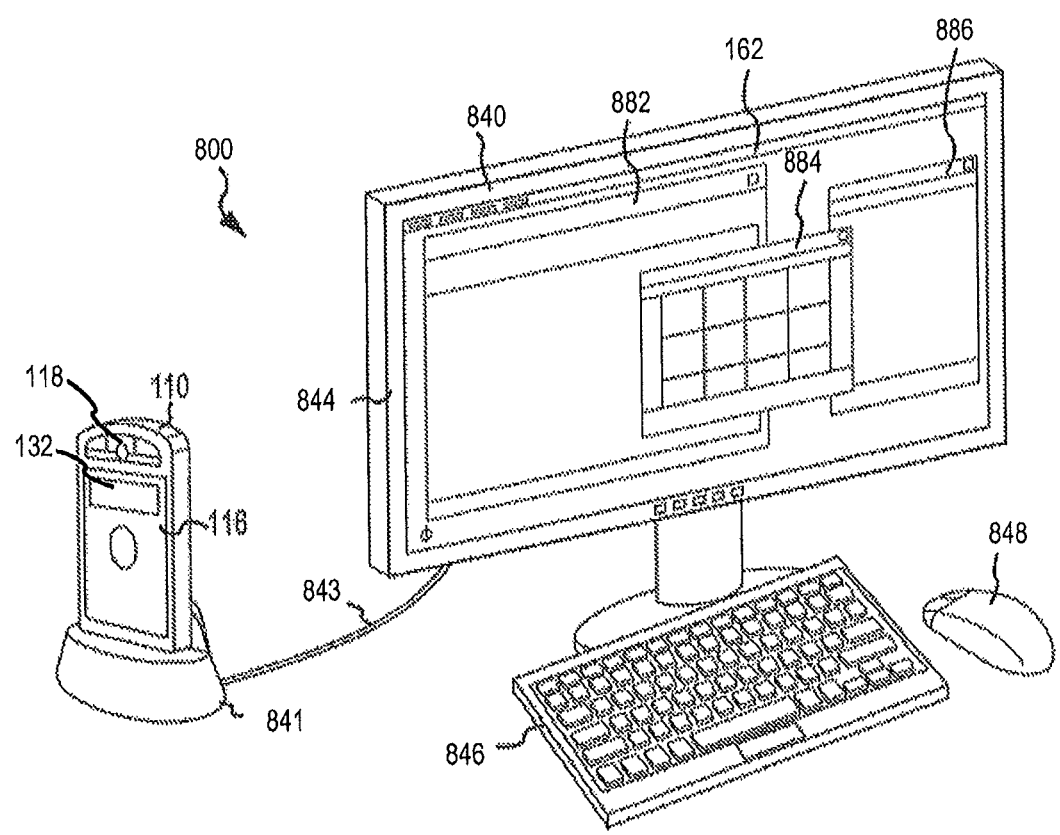
FIG. 8 illustrates aspects of an operating system architecture for a computing environment, according to various embodiments.

FIG. 8 shows an exemplary computing environment 800 in which OS architecture 300 may be employed, according to various embodiments. In computing environment 800, mobile OS 130 provides a mobile computing experience through the I/O devices of mobile computing device 110. Specifically, the user can interact with mobile OS 130 through mobile OS GUI 132 on touch-screen 116 and other I/O devices 118 that are integrated in mobile computing device hardware 112 of mobile computing device 110.

At the same time, personal computing device or processing module OS 160 provides a complete personal computing device or processing module computing experience through secondary terminal environment 840. As illustrated in FIG. 8, secondary terminal environment 840 includes dock cradle 841. Dock cradle 841 includes port 842 (not illustrated) that is connected to mobile computing device through interface 122. Dock cradle 841 is connected through interface 843 to display monitor 844, keyboard 846, and/or pointing device(s) 848.

FIG. 8 illustrates that personal computing device or processing module OS GUI 162 is displayed on display monitor 844 of secondary terminal environment 840. Applications 382 and 384, running on personal computing device or processing module OS 160, may be displayed in application windows 882, 884, and/or 886 within personal computing device or processing module OS GUI 162.

Figure 9:
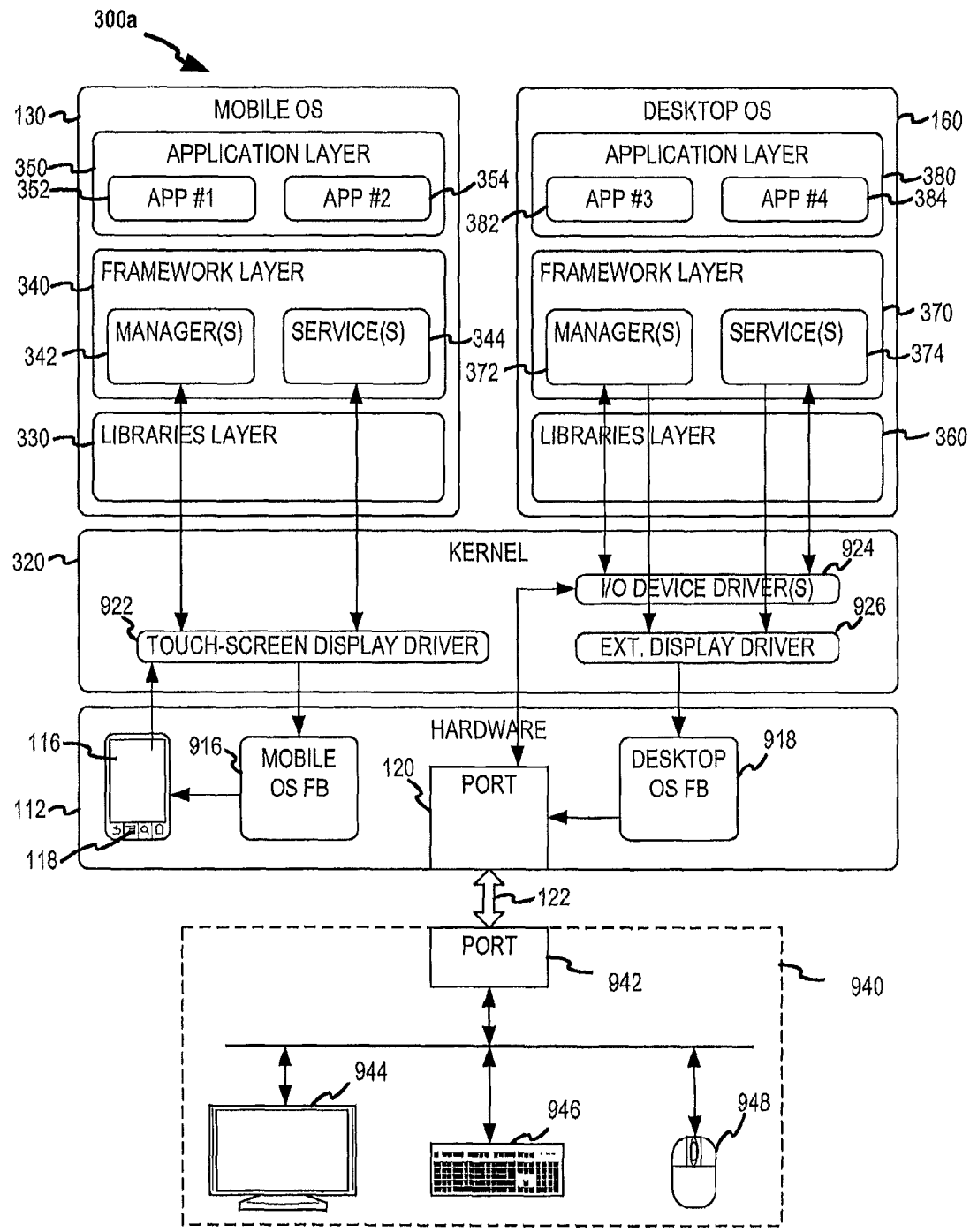
FIG. 9 illustrates an exemplary computing environment employing various aspects of embodiments.

FIG. 9 illustrates OS architecture configuration 300a that shows how aspects of OS architecture 300 may provide an enhanced user experience for a docked mobile computing device in more detail. In OS architecture 300a, mobile computing device 110 is docked to a secondary terminal environment that includes external monitor 844, keyboard 846, and pointing device(s) 848. For example, from the user's perspective, OS architecture 300a may correspond to computing environment 800, as illustrated in FIG. 8. In OS architecture 300a, mobile OS 130 is associated with touch screen display 116 on mobile computing device 110 through frame buffer 916. Personal computing device or vehicle processing module OS 160 is associated with external display monitor 944 through frame buffer 918.

To the user, keyboard 946, pointing device(s) 948, and display monitor 944 operate as an independent personal computing device or vehicle processing module running its own personal computing device or vehicle processing module OS 160, while mobile computing device 110 runs mobile OS 130, which the user interfaces through the mobile OS GUI on touch-screen 116. However, as illustrated in FIG. 9, mobile OS 130 and personal computing device or vehicle processing module OS 160 are running on shared kernel 320 on a processor in mobile computing device 110, for example, mobile processor 202 as illustrated in FIG. 2. Running mobile OS 130 and personal computing device or vehicle processing module OS 160 on shared kernel 320 provides for the user experience of a mobile computing device through the GUI of mobile OS 130, while providing a full personal computing device or processing module experience through the GUI of personal computing device or vehicle processing module OS 160 associated with a secondary terminal environment.

FIG. 9 illustrates aspects of how mobile OS 130 and personal computing device or vehicle processing module OS 160 run on shared kernel 320 without the overhead of virtualization. For example, frame buffer 916 and frame buffer 918 are allocated by shared kernel 320 and associated with frame buffer devices in shared kernel 320. Mobile OS 130 renders the mobile OS GUI (including applications 352 and 354) of mobile OS 130 by writing to the frame buffer device in shared kernel 320 associated with frame buffer 516. Touch-screen display driver 922 of shared kernel 320 then writes to mobile OS frame buffer 916 which is output to touch screen 116. Personal computing device or vehicle processing module OS 160 renders the personal computing device or vehicle processing module OS GUI (including applications 382 and 384)

of personal computing device or vehicle processing module OS 160 by writing to the frame buffer device in shared kernel 320 associated with frame buffer 918. External display driver 926 of shared kernel 320 then writes to personal computing device or vehicle processing module OS frame buffer 918 which is output to display monitor 944 through port 120. In this regard, shared kernel 320 provides direct access to frame buffer memory by both mobile OS 130 and personal computing device or vehicle processing module OS 160 through frame buffer devices without virtualization of addressing by either OS.

For example, applications 382 and 384 running on personal computing device or vehicle processing module OS 160 may be rendered by personal computing device or processing module OS 160 through the frame buffer device associated with frame buffer 918 in shared kernel 320. In OS architecture 300*a*, frame buffer 918 is displayed on external monitor 944. Applications 382 and 384 may correspond to application windows 882, 884, and/or 886 displayed on external monitor 844, as illustrated in FIG. 8.

Referring again to FIG. 9, input devices attached to mobile computing device 110 are also directly accessible for mobile OS 130 and personal computing device or vehicle processing module OS 160 through shared kernel 320 without virtualization. For example, personal computing device or vehicle processing module OS 160 can accept input from keyboard 946 and pointing device(s) 948 directly without the need for a virtual device or virtual device file. Specifically, mobile OS 130 and personal computing device or vehicle processing module OS 160 can directly access input devices and/or device files of shared kernel 320, without these input devices or device files being translated, mapped, or virtualized.

To improve the user experience in various environments, some embodiments may include various features to facilitate cross-environmental cooperation of multiple operating systems running on a shared kernel. Embodiments of the present disclosure may include various features for OS management, cross-environment communication, cross-environment application rendering, translation of application data between environments, cross-environment application mirroring.

According to various embodiments, a mobile computing device running a mobile OS and a personal computing device or vehicle processing module OS on a shared kernel may be used in a computing system that includes various computing environments. In these embodiments, the mobile computing device may be docked to various devices that extend the functionality of the mobile computing device. For example, the mobile computing device may be docked to a tablet. In this example, the mobile OS GUI may be extended to the screen of the tablet. For example, the mobile OS may be interfaced through a touch-screen of the tablet. Further, the tablet may be docked to a personal computing device or vehicle processing module-like terminal environment. When docked to the personal computing device or vehicle processing module-like terminal environment, the personal computing device or processing module OS may be resumed and configured for the terminal environment.

In some embodiments, an innovative cross-environment communications framework ("CECF") allows for fast communications between applications in two operating systems running independently and concurrently (e.g., on the same kernel). Embodiments include an extended IPC mechanism that allows for application-to-application communications. For example, applications can register with a remote communication service to be able to communicate (e.g., synchronize data, settings, etc.) in a synchronous and/or asynchronous way.

In other embodiments, seamless translation of application data between two similar applications running in separate operating systems running concurrently and independently on a shared kernel is provided. In embodiments, this may be implemented using a framework like CECF. For example, a mobile spreadsheet application and a desktop spreadsheet application are both installed on a mobile computing device. When the device is un-docked, the mobile application is used with all the spreadsheet data formatted as needed for the mobile-based spreadsheet. When the device is docked in personal computing device or vehicle processing module terminal environment (e.g., smartbook), the personal computing device or vehicle processing module spreadsheet program automatically opens with the latest spreadsheet data seamlessly available in the desktop spreadsheet application.

In other embodiments, an application running in one operating system may be displayed within an environment provided by a second operating system, where the two operating systems are running independently and concurrently on a shared kernel. For example, within a personal computing device or vehicle processing module environment of a personal computing device or vehicle processing module OS, a user can launch a mobile application, which will run from the mobile OS (e.g., through an X11-type terminal, not by porting the application or running a virtualized mobile OS). Notably, the mobile application can be any mobile application stored on the mobile device, regardless of whether the application is currently being displayed in the mobile OS GUI.

In other embodiments, applications running in a first OS may be displayed within an environment provided by a second OS, where the two operating systems are running independently and concurrently on a shared kernel. Graphics data for the first OS is directly accessed by the second OS. Specifically, all surfaces for applications in the first OS are kept in a shared memory space. The graphics server of the first OS communicates to a client application in the second OS by passing file descriptors to the memory allocated for the surfaces. In one implementation, a chrooted Linux operating system (i.e., Hydroid) and an Android operating system concurrently run on a single Android kernel on a mobile device. An X11 client in Hydroid connects to the graphics server ("SurfaceFlinger") in Android to request information for a certain surface, and a service within Android ("Hydroid Bond") registers the X11 client to receive draw notifications for the surface.

In other embodiments, a mobile computing device detects a docked environment and configures a second OS to take advantage of the docked environment, where the second OS runs independently and concurrently with a first OS on a shared kernel. In one implementation, a chrooted Linux operating system (i.e., Hydroid) and an Android operating system concurrently run on a single Linux kernel on a mobile device. When the mobile device is not docked the Android operating system is tailored to the context (e.g., input/output capabilities, power management, communications, etc.) of the mobile device. When the mobile device is docked with a laptop, the mobile device automatically detects the laptop environment and configures the Linux environment to fully utilize that laptop environment.

In other embodiments, a mobile computing device automatically detects a docked environment and wakes up a suspended, full-featured, secondary operating system for use in the docked environment. In one implementation, a chrooted Linux operating system (i.e., Hydroid) and an Android operating system always concurrently run on a single Linux kernel on a mobile device. When the mobile device is not docked the Android operating system drives the mobile device display, etc., and the Linux operating system is in a suspended mode (e.g., it can still exploit the CECF). When the mobile device is docked with a laptop, the mobile device automatically detects the laptop environment and wakes up the Linux operating system to support the laptop environment.

In other embodiments, an application running in a first OS is mirrored to a display window of a second OS (e.g., on a separate display), where the two operating systems are running independently and concurrently on a shared kernel. For example, a display associated with the second OS (i.e., the second OS GUI) displays a window in which the first OS GUI is mirrored. Embodiments effectively implement this functionality by copying the frame buffer from the mobile environment to the personal computing device or processing module environment. Notably, the window may substantially mimic use of the mobile device (rather than generally being able to run mobile applications).

In other embodiments, full interaction support of a docked environment to redirected and/or mirrored applications is provided. For example, a mobile computing device may be configured with limited touchscreen capability and no keyboard, mouse, or other input device. The mobile device is docked in a tablet having advanced touchscreen and stylus support, and a connected external keyboard. When a mobile application is displayed in the personal computing device or processing module environment on the tablet display, a user can interact with the mobile application using the full input/output capabilities of the tablet environment, even if the same application being displayed on the mobile device would have more limited interactivity.

As described above, in one embodiment an Android mobile as and a Linux personal computing device or processing module OS (i.e., Hydroid) run concurrently on the same shared kernel of a single mobile computing device. The Android mobile OS provides a mobile computing experience through mobile computing hardware and the Linux personal computing device or processing module OS provides a personal computing device or processing module computing experience through a secondary terminal environment having a user experience profile associated with the Linux OS.

However, other OS combinations are contemplated as within various embodiments of the disclosure. For example, various aspects of the disclosure may be used to run Windows Mobile and Windows 7 on a shared kernel or sharing common kernel-mode processes. As another example, iOS and Mac OS X running on a shared kernel is also within the scope of various embodiments. Furthermore, aspects of the disclosure may be used advantageously by combinations of embedded OS's and personal computing device or vehicle processing module or mobile OS's running on a shared kernel.

The foregoing description has been presented for purposes of illustration and description. Furthermore, the description is not intended to limit embodiments of the disclosure to the form disclosed herein. While a number of exemplary aspects and embodiments have been discussed above, those of skill in the art will recognize certain variations, modifications, permutations, additions, and sub-combinations thereof.

The various operations of methods described above may be performed by any suitable means capable of performing the corresponding functions. The means may include various hardware and/or software component(s) and/or module(s), including, but not limited to a circuit, an application specific integrated circuit (ASIC), or processor.

The various illustrative logical blocks, modules, and circuits described may be implemented or performed with a general purpose processor, a digital signal processor (DSP), an ASIC, a field programmable gate array signal (FPGA), or other programmable logic device (PLD), discrete gate, or transistor logic, discrete hardware components, or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of tangible storage medium.

Some examples of storage media that may be used include random access memory (RAM), read only memory (ROM), flash memory, EPROM memory, EEPROM memory, registers, a hard disk, a removable disk, a CD-ROM and so forth. A storage medium may be coupled to a processor such that the processor can read information from, and write information to, the storage medium. In the alternative, the storage medium may be integral to the processor. A software module may be a single instruction, or many instructions, and may be distributed over several different code segments, among different programs, and across multiple storage media.

The methods disclosed herein comprise one or more actions for achieving the described method. The method and/or actions may be interchanged with one another without departing from the scope of the claims. In other words, unless a specific order of actions is specified, the order and/or use of specific actions may be modified without departing from the scope of the claims.

The Multi-Operating System-Equipped Vehicle

Figure 10:
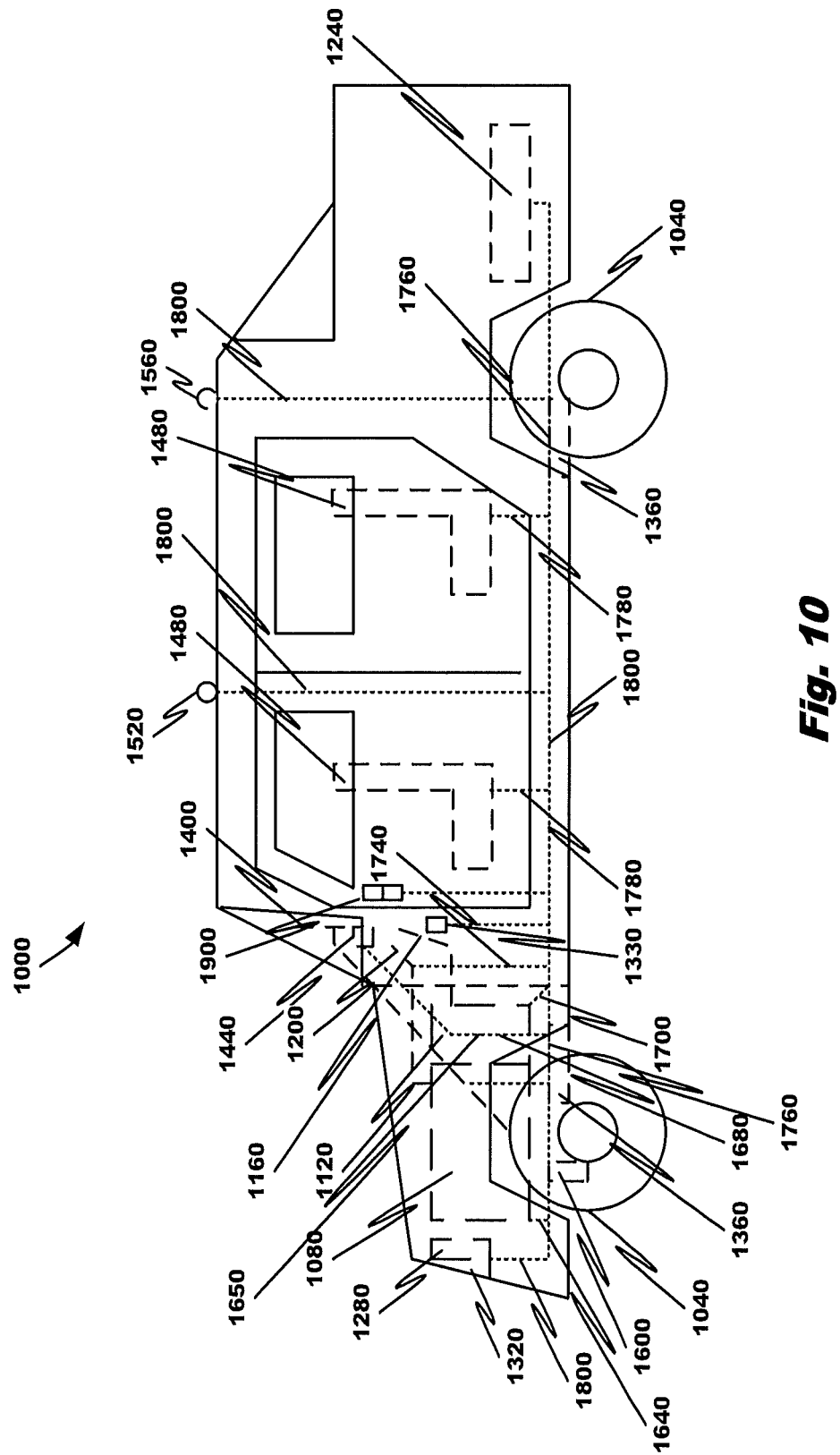
FIG. 10 illustrates a vehicle according to an embodiment.
Figure 11:
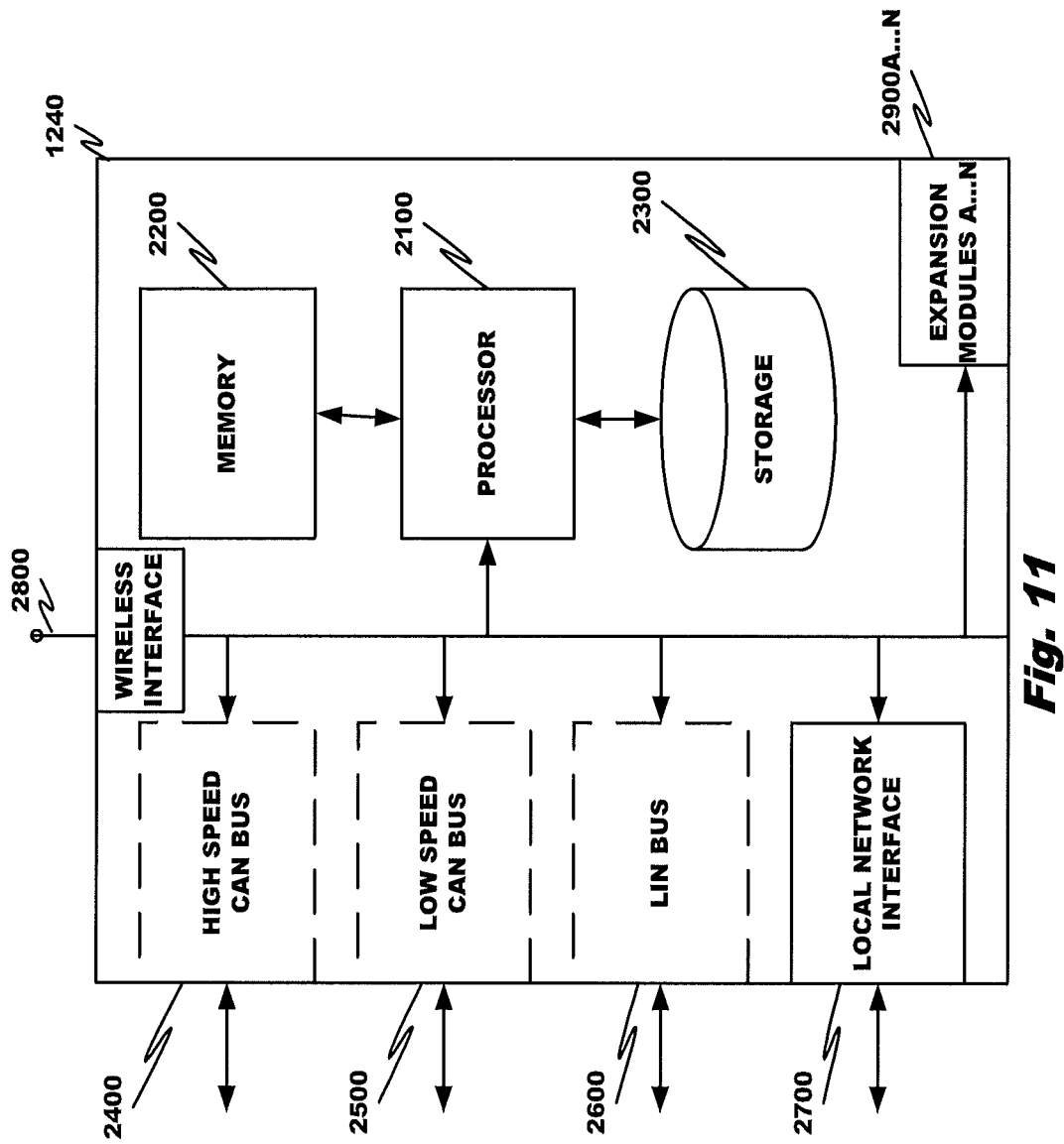
FIG. 11 is a block diagram illustrating a processing module according to an embodiment.
Figure 12:
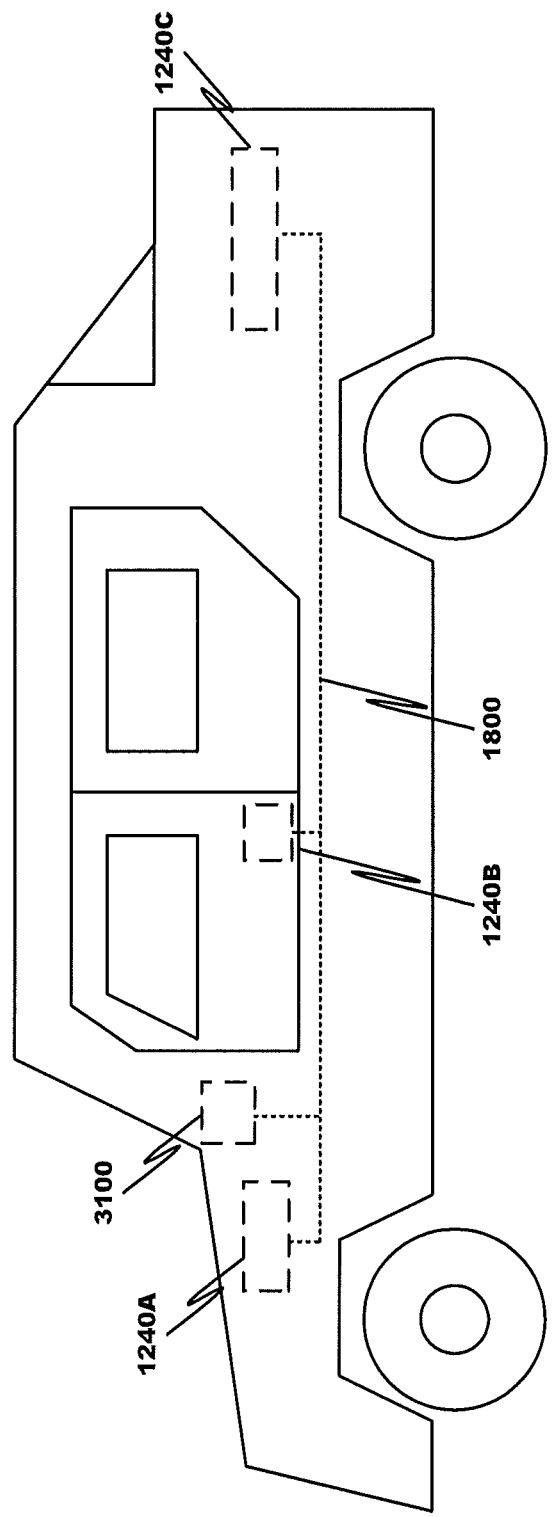
FIG. 12 illustrates a vehicle according to an embodiment.

FIGS. 10-12 collectively illustrate a vehicle 1000 incorporating various features.

The vehicle 1000 includes, among many components common to vehicles, wheels 1040, a power source 1080 (such as an engine, motor, or energy storage system (e.g., battery or capacitive energy storage system)), a manual or automatic transmission 1120, a manual or automatic transmission gear controller 1160, a power controller 1200 (such as a throttle), a braking system 1360, a steering wheel 1400, a display panel 1440 (e.g., a dashboard displaying information regarding components in vehicle 1000), and an occupant seating system 1480.

Other components in vehicle 1000 include communication components such as a wireless signal receiver 1520 to receive wireless signals from signal sources such as roadside beacons and other electronic roadside devices, and a satellite positioning system receiver 1560 (e.g., a Global Positioning System ("GPS") (US), GLONASS (Russia), Galileo positioning system (EU), Compass navigation system (China), and Regional Navigational Satellite System (India) receiver).

The vehicle 1000 also includes a number of control units and sensors for the various components of vehicle 1000. Exemplary control units and sensors therefor include wheel state sensor 1600 to sense one or more of vehicle speed, acceleration, deceleration, wheel rotation, wheel speed (e.g., wheel revolutions-per-minute), wheel slip, and the like. Power source controller and energy output sensor 1640 controls the power source and to senses a power output of the power source 1080. Example aspects of power source controller and energy output sensor 1650 include balancing the mixture of fuel (e.g. gasoline, natural gas, or other sources of fuel) and other elements (e.g. air for combustion) and measuring one or more of current engine speed (e.g., revolutions-per-minute), energy input and/or output (e.g., voltage, current, fuel consumption, and torque), and the like. Switch state control unit 1680 activates or deactivates the power source (e.g. the ignition). Transmission control unit ("TCU") 1700 sets the current state the transmission (e.g., gear selection or setting) based on the state of gear controller 1160. Power control unit 1740 sets the throttle for power source 1080 given the state of power controller 1200. Brake control unit 1760 operates the current state (braking or non-braking) of braking system 1360 based on the state of the brake controller (which could be linked to power controller 1200).

Vehicle 1000 also includes other control units and sensors for safety purposes. An airbag deployment system includes an airbag deployment control unit 1330 and a collision sensor 1320. When a collision is detected by collision sensor 1320, data is sent to airbag release control unit 1330 which determines whether to deploy the airbag based on the data received (e.g., the speed of the collision and the area of impact to determine whether an airbag deployment can promote safety). Other safety components include seat belt control unit and sensors for setting the seat belt (e.g. engaging or disengaging the seat belt during hard breaking), head light control unit and sensors for headlight 1280 and other lights (e.g. emergency light, brake light, parking light, fog light, interior or passenger compartment light, and/or tail light state (on or off)), door settings (locking and unlocking), window settings (opening or closing), one or cameras or other imaging sensors (which commonly convert an optical image into an electronic signal but may include other devices for detection objects such as an electromagnetic radiation emitter/receiver that emits electromagnetic radiation and receives electromagnetic waves reflected by the object) to sense objects, such as other vehicles and pedestrians and optionally determine the distance, trajectory and speed of such objects, in the vicinity or path of the vehicle, and other components and sensors as known in the art.

Vehicle 1000 further includes components for the convenience and enjoyment of the occupants or operators. Seating system controller and sensor 1780 sets the position and other settings of a seat and measure various attributes of an occupant of the seat (e.g., the current weight of seated occupant) in a selected seat of the seating system 1480. Entertainment system 1900, preferably located in the head unit of the passenger compartment, provides entertainment options such as music or video for occupants of vehicle 1000.

Examples of other vehicle components include one or more cameras or other imaging sensors (which commonly convert an optical image into an electronic signal but may include other devices for detection objects such as an electromagnetic radiation emitter/receiver that emits electromagnetic radiation and receives electromagnetic waves reflected by the object) to sense objects, such as other vehicles and pedestrians and optionally determine the distance, trajectory and speed of such objects, in the vicinity or path of the vehicle, odometer reading sensor, trip mileage reading sensor, wind speed sensor, radar transmitter/receiver output, brake wear sensor, steering/torque sensor, oxygen sensor, ambient lighting sensor, vision system sensor, ranging sensor, parking sensor, heating, venting, and air conditioning (HVAC) sensor, water sensor, air-fuel ratio meter, blind spot monitor, hall effect sensor, microphone, radio frequency (RF) sensor, infrared (IR) sensor, vehicle control system sensors, wireless network sensor (e.g., Wi-Fi and/or Bluetooth sensor), cellular data sensor, and other sensors known to those of skill in the vehicle art.

Vehicle 1000 includes one or more vehicle buses 1800 for connecting the various components and systems of vehicle 1000 as described above. In modern vehicles, subsystems such as an anti-lock braking system (ABS), which may be used by brake control unit 1760 and braking system 1360, engine control unit (ECU), which may be used by power source control 1640, transmission control unit (TCU), which may be used by transmission control unit 1700 and gear controller 1160, and supplemental restraint system (SRS), such as airbag deployment control unit 1330 and collision sensor 1320 and seating system controller and sensor 1780, are frequently interconnected using a standardized bus. Standardized buses for use in vehicles include Controller Area Network (CAN), and Local Interconnect Network (LIN) and others, as are known in the art. In particular, these components and subsystems may use the high-speed CAN bus for real-time information. Other components with lower priorities may use the low-speed CAN bus to transmit information. Vehicle bus 1800 (which is optional) is illustrated as one bus in FIG. 10. However, vehicle 1000 may include one or more of these standardized buses, such as a combination of the high-speed and low-speed CAN, LIN, and/or other buses. Also, vehicle bus 1800 may further include and support extensions to standardized buses, such as the FlexCAN extension to the CAN bus. Further, vehicle bus 1800 may include standardized communication networks that can be implemented vehicle 1000. Well known networks include Ethernet, Wi-Fi, USB, $I^2C$, RS232, RS485 and FireWire.

Vehicle 1000 also includes processing module 1240. Preferably, processing module 1240 is placed in the trunk, hood (not shown), behind the head unit (not shown), and/or other accessible but unseen locations. Processing module 1240 is coupled to vehicle bus 1800 and provides processing for data related to vehicle bus 1800 and other vehicle components.

Processing modules, for example, can perform, monitor, and/or control critical and non-critical tasks, functions, and operations, such as interaction with and/or monitoring and/or control of critical and non-critical on board sensors and vehicle operations (e.g., engine, transmission, throttle, brake power assist/brake lock-up, electronic suspension, traction and stability control, parallel parking assistance, occupant protection systems, power steering assistance, self-diagnostics, event data recorders, steer-by-wire and/or brake-by-wire operations, vehicle-to-vehicle interactions, vehicle-to-infrastructure interactions, partial and/or full automation, telematics, navigation/SPS, multimedia systems, audio systems, rear seat entertainment systems, game consoles, tuners (SDR), heads-up display, night vision, lane departure warning, adaptive cruise control, adaptive headlights, collision warning, blind spot sensors, park/reverse assistance, tire pressure monitoring, traffic signal recognition, vehicle tracking (e.g., LoJack™), dashboard/instrument cluster, lights, seats, climate control, voice recognition, remote keyless entry, security alarm systems, and wiper/window control). Processing modules can be enclosed in an advanced EMI-shielded enclosure containing multiple expansion modules. Processing modules can have a "black box" or flight data recorder technology, containing an event (or driving history) recorder (containing operational information collected from vehicle on board sensors and provided by nearby or roadside signal transmitters), a crash survivable memory unit, an integrated controller and circuitry board, and network interfaces. Processing module 1240 is further disclosed with reference to FIG. 11.

As set forth below and as shown in FIG. 12, multiple processing modules 1240a-c may be located at various locations in a common vehicle. The disparate, spaced apart locations of the processing modules 1240a-c provide redundancy in the event of a collision or other catastrophic event. For example, a collision with the rear of the vehicle 1000 may damage the processing module 1240c but not the processing modules 1240a,b.

As will be appreciated, the multiple processing modules 1240a-c may be configured to operate in an active/active and/or active/standby mode. These operating modes describe the manner in which first and second (redundant) devices operate under normal conditions. In active/standby implementations, only the primary device in a pair processes information and issues commands. The standby device sits idle, ready to assume the active role should the primary device fail. The standby device may receive, from the primary device, processing, command, and primary device state information to facilitate stateful failover, but it does not itself commonly perform meaningful work until the primary device fails. In active/active implementations, both devices are online and collaboratively process information and issue commands under normal conditions. When one device fails, all processing is handled by the remaining device.

A user can be an occupant of a vehicle 1000 that implements the system of FIG. 10. A user can further be an assembler, technician, or mechanic working on the vehicle to configure the system of FIG. 10 for use by an end-user of the vehicle.

FIG. 11 illustrates an exemplary block diagram for a (primary and/or secondary) processing module 1240a-c.

Processing module 1240 may include processor 2100, memory 2200, storage 2300, and interfaces for one or more buses 2400-2700. Among the interfaces 2400-2700 include high-speed CAN bus 2400, low-speed CAN bus 2500, LIN bus 2600, network interface 2700, and/or wireless interface 2800. One skilled in the art will recognize that processing module 1240 may take other configurations and with other buses as known in the art, and interfaces 2400-2900 may be implemented with more or fewer buses than those shown.

The operations of processing module 1240 will now be described with respect to the high-speed CAN bus interface 2400 and low-speed CAN bus interface 2500 as an exemplary configuration in one embodiment of the invention. In one implementation, processing module 1240 receives data transmitted over vehicle bus 1800 through high-speed CAN bus interface 2400 and/or low-speed CAN bus interface 2500. Data transmitted over the high-speed CAN bus includes priority data from subsystems such as anti-lock braking system (ABS), which may be used by brake control unit 1760 and braking system 1360, engine control unit (ECU), which may be used by power source control 1640, transmission control unit (TCU), which may be used by transmission control unit 1700 and gear controller 1160, and supplemental restraint system (SRS), such as airbag deployment control unit 1330 and collision sensor 1320 and seating system controller and sensor 1780, as described above. Data transmitted over the low-speed CAN bus includes other noncritical data, such as engine temperature and oil pressure sensor readings.

Wireless interface 2800, by contrast, can be a transceiver for one or more long, intermediate, or short range wireless networks, such as a radio (e.g., cellular such as CDMA, GSM, or IS-95 network), 802.X, a WiFi™ network, a Bluetooth™ network, and the like, sending and receiving a wide variety of information, including lower priority information, such as data for the convenience and enjoyment of the occupants in entertainment system 1900 or seating system 1480. The wireless interface 2800 can access information over one or more wireless networks using an appropriate protocol, such as the Wireless Application Protocol, Wireless Internet Protocol, Wireless Session Protocol, Bluetooth Wireless Protocol, Wireless Datagram Protocol, Wireless HART Protocol, Wired Equivalent Privacy (WEP), MiWi and MiWi P2P, RuBee (IEEE standard 1902.1), Wireless USB, Wireless Transport Layer Security (WTLS), and the like. In one vehicle configuration, the wireless interface 2800 connects, via a short distance protocol such as Bluetooth™ or WiFi™, to an external computational device, such as a cell phone, personal digital assistant, laptop, personal computer, or tablet computer, for access to remote nodes over the Internet.

Local network interface 2700 is a transceiver for signals exchanged with other on board components of the vehicle (including the components discussed above with respect to FIG. 10). The signals may be sent over a wired or wireless (or combination thereof) network. In one configuration, the local network interface is a wireless access point. Any suitable local area network protocol may be used, with the Ethernet protocol and the short-range protocols mentioned above being examples.

The processor 2100 may comprise a general purpose programmable (micro)processor or controller for executing application programming or instructions. In accordance with at least some embodiments, the processor 2100 may include multiple processor cores, and/or implement multiple virtual processors. In accordance with still other embodiments, the processor 2100 may include multiple physical processors. As a particular example, the processor 2100 may comprise a specially configured application specific integrated circuit (ASIC) or other integrated circuit, a digital signal processor, a controller, a hardwired electronic or logic circuit, a programmable logic device or gate array, a special purpose computer, or the like. The processor 2100 generally functions to run programming code or instructions implementing various functions of the device 1240.

Memory 2200 for use in connection with the execution of application programming or instructions by the processor 2100, and for the temporary or long term storage of program instructions and/or data. As examples, the memory 2200 may comprise RAM, DRAM, SDRAM, or other solid state memory. Alternatively or in addition, data storage 2300 may be provided. Like the memory 2200, the data storage 2300 may comprise a solid state memory device or devices. Alternatively or in addition, the data storage 2300 may comprise a hard disk drive or other random access memory.

FIG. 12 depicts a vehicle with multiple processing modules according to an embodiment. The vehicle includes bus 1800, vehicle component 3100, and processing modules 1240A-C.

Vehicle component 3100 is an exemplary vehicle component for illustration purposes that is connected to bus 1800. Vehicle component 3100 may represent any of the vehicle components discussed in connection with vehicle 1000 (FIG. 10).

Each of the processing modules 1240A-C is each coupled to bus 1800. Processing module 124A is located in the engine compartment of vehicle; processing module 1240B is located in the passenger compartment of vehicle; and processing module 1240C is located in the truck of vehicle.

In one configuration, some of the processing modules 1240A-C may have limited processing functions as compared to the others. For example, processing module 1240A may act as the default processing module for vehicle normally because of its location being close to most critical vehicle components in the engine compartment (i.e., ECU, TCU). If the other processing modules 1240B-C are only needed for redundancy, they may be implemented to only have limited capabilities (i.e., these processing modules would not be require to have processing all critical and non-critical functions). This implementation has the advantage of reduced costs and/or space as compared to fitting processing module will full capabilities. The processing modules 1240A-C may also have cascading levels of capabilities. For example, processing module 1240B is fitted in the passenger compartment and is deemed to most likely survive a collision; it may be required to have capabilities critical to vehicle operation but no other capabilities to save space in the passenger compartment. Processing module 1240C may have additional capabilities such as a cellular module so that emergency calls may be automatically placed if the default processing module 1240A fails.

In another configuration, each of the processing modules 1240A-C may have different capabilities. For example, processing module 1240A may have capabilities only for critical vehicle functions; processing module 1240C may have capabilities only for non-critical vehicle functions; and processing module 1240B may be reserved for back-up processing of both critical and non-critical vehicle functions. In one implementation, processing may be off-loaded to another processing module if one module becomes overloaded. This configuration has the advantage further reduction in costs and space because processing power is not wasted due to redundancy. In the case where one processing module malfunctions, the other processing modules may pick up processing duties via a processor off-load procedure. If there is not enough processing power all wanted functionalities, the processing modules may work together to prioritize critical vehicle functions ahead of non-critical functions.

Figure 13:
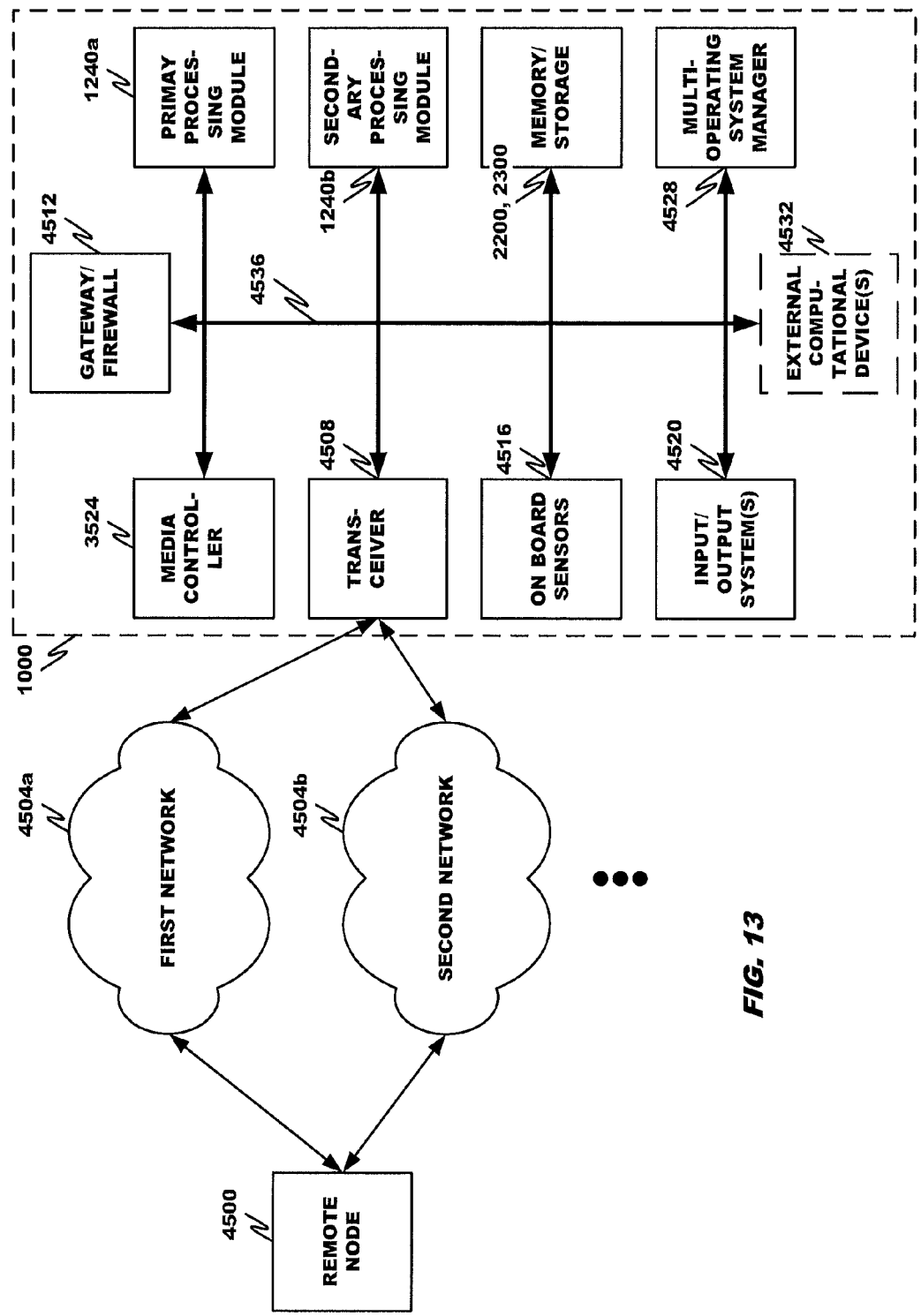
FIG. 13 is a block diagram illustrating a network architecture according to an embodiment.

FIG. 13 depicts the vehicle 1000 in communication, via first, second, . . . networks 4504 *a, b,* . . . , with a remote node 4500, such as a computational device, e.g., a server, mobile phone, tablet computer, laptop computer, personal computer, and the like, of the vehicle owner, law enforcement authority, insurance company, vehicle or parts manufacturer/vendor (e.g., to provide vehicle diagnostics, maintenance alerts, vehicle or part recall notifications, and/or predictive analytics), a service provider (e.g., a convenience service provider such as a service to connect the vehicle operator with a dealer, a service to locate the vehicle, a service to provide vehicle information and/or feature assistance, an automotive navigation system service and a service to start a vehicle (OnStar™ being an example), a location-based service provider (e.g., traffic and/or weather reporting and/or adviser on gas, accommodations, navigation, parking assistance, and/or food), Internet content provider, software vendor, concierge service provider, a processing module of another vehicle, a roadside monitor, sign, beacon, and the like, to name a few.

The first, second, . . . networks 4504*a,b,* . . . can be any wireless network, such as a radio or cellular network (e.g., CDMA, CDMA2000, AMPS, D-AMPS, TACS, ETACS, CSK, CDMAOne, GSM, EDGE, GPRS, HSCSD, UMTS, WCDMA, HSPA, WIMAX, WIMAX ADVANCED, LTE ADVANCED, or FDMA in accordance with the 1G, 2G, 2G transitional, 3G, 3G transitional, 4G or 5G cellular network standards), a Wi Fi network, a Bluetooth network, and the like.

The vehicle 1000 includes a transceiver 4508 to send and receive signals over a selected one of the first, second, . . . networks 4504 *a, b,* . . . , a gateway/firewall 4512 to provide secure connectivity between the various components of the vehicle 1000 and the first, second, . . . networks 4504*a, b,* . . . , primary and secondary processing modules 1240*a* and *b*, memory/storage 2200 or 2300, on board sensors 4516 (discussed above with reference to FIG. 10), input/output system(s) 4520 and associated media controller (discussed below) to manage and control the output presented by the input/output system(s) to the user, external computational device(s) 4532 of occupants, such as wireless capable mobile phones, personal digital assistants, tablet computers, laptop computers, and the like, and a multi-operating system manager 4528 to supervise and control instantiation of multi-operating systems executing on a processing module 1240. The various components are connected by a bus, wireless network, or combination thereof (denoted by reference 4536).

Figure 14:
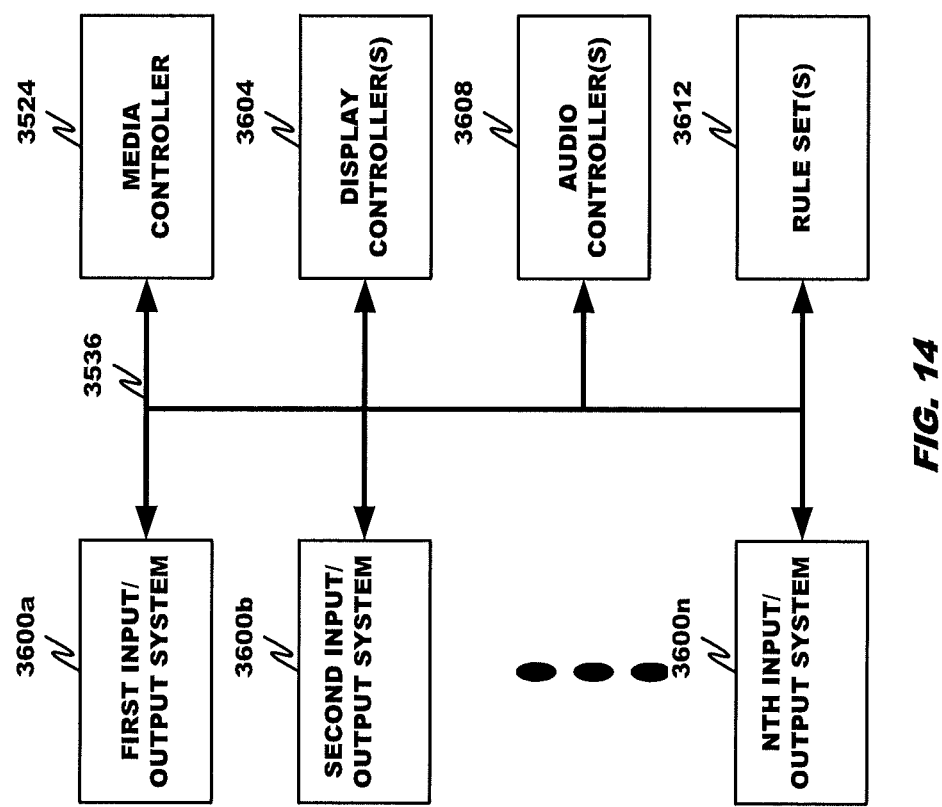
FIG. 14 is a block diagram illustrating part of a vehicle infotainment system according to an embodiment.

FIG. 14 depicts an exemplary input/output architecture for an infotainment system of the vehicle 1000. The architecture includes first, second, . . . nth input/output systems 3600*a-n*, the media controller 3524, display controller(s) 3604 to receive user input via the input/output system(s) and configure the output presented by the input/output system(s) to the user, audio controller(s) 3608 to control audio output to the user, and rule sets 3612 (stored in memory/storage 2200, 2300) to regulate corresponding features/functions of the vehicle 1000, particularly the information and/or other output provided to each occupant by a respective input/output system. Generally, each of the multiple occupants has a separate and corresponding input/output system 3600. For example, each seat 1480 can have a corresponding input/output system 3600.

The external computational device(s) 4532 can dock or wirelessly communicate with a processing module and/or a wireless access point or wired or wireless docking station at each input/output system 4520. When an external computational device 4532 is docked or otherwise in direct or indirect wireless communication with a processing module 1240, the multi-operating system manager 4528 can apply rules and determine whether to instantiate multi-operating systems executing in a selected one of the processing module or cause multi-operating systems to execute on the external computational device 4532. When the user desires to use an input/output system or external computational device interface and the multi-operating systems and selected application(s) are instantiated on the other of the input/output system or external computational device, the output of the application can be streamed or otherwise transmitted to the interface selected by the user.

Examples of applications accessible via a processing module 1240 include programs such as vehicle control applications (e.g., sensed information display icons (such as in the form of dials, gauges, and the like (e.g., odometer, speedometer, oil pressure, tacometer, battery voltage, tire pressure, gas tank level, engine temperature, indoor/outdoor temperature, trip computers, vehicle/component status reporting, maintenance tire pressure, vehicle/component performance monitoring, and other vehicle-related (sensed) information), applications associated with at least one vehicle function, applications related to handicap and accessibility graphical user interfaces (e.g., larger fonts, controls, text-to-speech and/or speech-to-text interfaces, speech command interfaces, etc.), email clients, web browsers, communications applications (e.g., email applications, texting applications, telephony applications, etc.), games (solo or multi-party games, including games played against other drivers), entertainment applications such as media players (e.g., to enable access to, viewing of, or listening to multimedia files, particularly audio and/or video files), satellite positioning system receiver applications (e.g., for location tracking, fleet tracking, geocoding, geofencing, geotagging, traffic patterns, navigating to a selected destination or other location, and other location-based services), map applications, medical information applications, emergency service applications, noise suppression applications, news-related applications (to provide local, national, and/or international news from a news source), weather information-related applications (to provide local, national, and/or international weather information, such as forecasts, radar images, social networking applications, road conditions, and current weather conditions), biometric applications (e.g., to determine an identity of or authenticate a user, to determine a current medical condition of a user, to determine a current sobriety state of a user, and the like), travel applications (e.g., applications providing the operator with booking or reservation information, traffic information, fuel pricing information, point-of-interest information, and the like), utility applications (e.g., office suites, electronic calendars, electronic clocks, and the like), etc.

The applications can be stored in an application store, which may represent any memory or data storage, and the management software associated therewith, for storing the applications.

Figure 15:
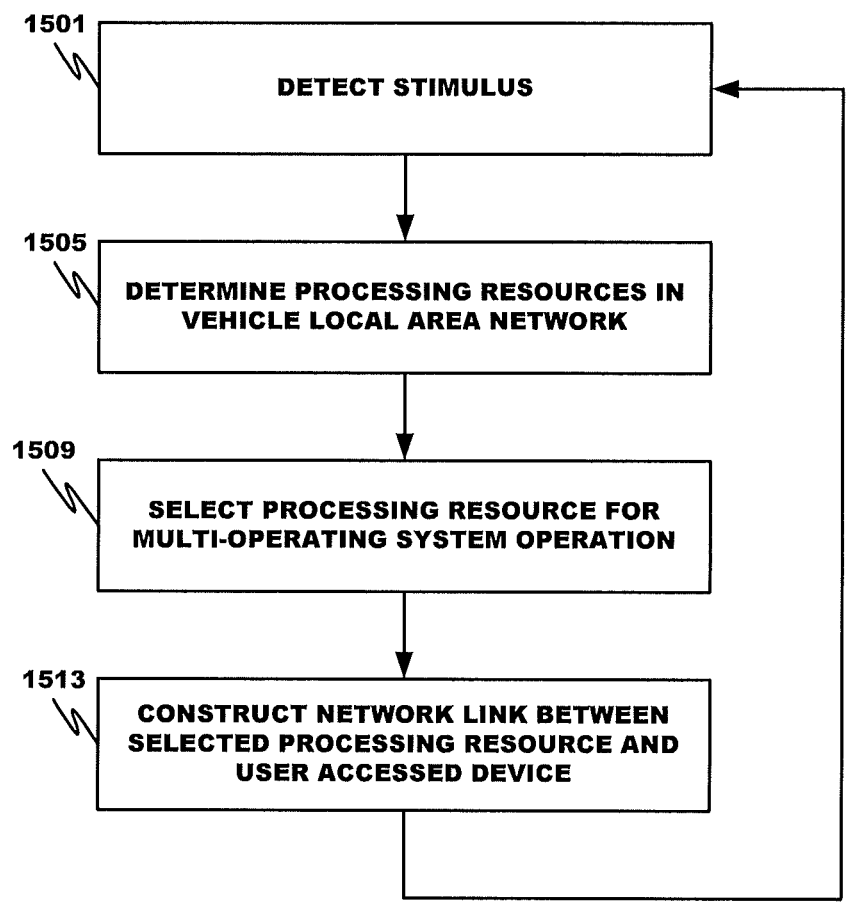
FIG. 15 is a block diagram illustrating operation of a multi-operating system manager according to an embodiment.

An operation of the multi-operating system manager 4528 will now be discussed with reference to FIG. 15.

In step 1501, the multi-operating system manager 4528 detects a stimulus. Stimuli include user request to initiate execution of an application, notification of a processing resource having unused bandwidth below a selected threshold, notification of a processing resource having used bandwidth above a selected threshold, a power level of a processing resource falling below a selected threshold, notification of a processing resource having an operational error, malfunction, or outage, and the like.

In step 1505, the multi-operating system manager 4528 determines available processing resources, both those on board the vehicle, such as processing module(s), and external computational devices 4532 in wireless communication with a local area network of the vehicle.

In step 1509, the multi-operating system manager 4528 selects one of the available processing resources for multi-operating system operation. Factors considered in determining where to instantiate multi-operating systems include where the software application desired by the user is located, whether the user desires access to the application through an input/output system 4520 or through the external computational device 4532, the processing resources available at each of the processing module(s) 1240a-b and external computational device 4532, the application and operating system requirements as compared to the capabilities of each of the processing modules and external computational device, power levels in each processing resource, and the like.

For example, if an external computational device 4532, such as a laptop, tablet computer, or cell phone, is running low on power, the multi-operating system manager 4528 can cause a processing module to initiate multi-operating system operation with one of the operating systems being that of the processing module and the other that of the external computational device 4532. The application previously or to be executed by the external computational device 4532 can then be executed by the processing module 1240. The output of the processing module 1240 can be provided, such as by a network link, to the external computational device 4532. The seamless transition will not cause the user to suspect that the application initiated on the external computational device 4532 is being executed on a different device.

In step 1514, the multi-operating system manager 4528 then constructs or causes the construction of a (typically wireless) network link between the selected processing resource and the user accessed device.

The exemplary systems and methods of this disclosure have been described in relation to various computational systems. However, to avoid unnecessarily obscuring the present disclosure, the preceding description omits a number of known structures and devices. This omission is not to be construed as a limitation of the scopes of the claims. Specific details are set forth to provide an understanding of the present disclosure. It should however be appreciated that the present disclosure may be practiced in a variety of ways beyond the specific detail set forth herein.

Furthermore, while the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A vehicle, comprising:
a power source to propel the vehicle;
a display panel to provide graphical information to a vehicle occupant; and
an on board processing module, comprising:
a first operating system running in a first execution environment on a shared kernel, the first operating system having a first application framework supporting a first vehicle-related application; and
a second operating system running concurrently with the first operating system in a second execution environment on the shared kernel, the second operating system having a second application framework supporting a second vehicle-related application, wherein the second vehicle-related application is incompatible with the first application framework, wherein the first operating system is based on the shared kernel and the second operating system is not based on the shared kernel, wherein the first and second operating systems run independently on the shared kernel, and wherein at least one of the first and second vehicle-related applications is one of the following: a vehicle control application, an application associated with at least one vehicle function, an application related to a handicap and accessibility graphical user interface for the display panel, an email client, a web browser, a communications application, a game, an entertainment application, a vehicle satellite positioning system receiver application, an automotive navigation application, a medical information application, an emergency service application, a noise suppression application, a news-related application, a weather information-related application, a biometric application, a travel application, or a utility application.

2. The system of claim 1, wherein the first operating system includes a first set of user libraries in the first execution environment, wherein each of the first and second operating systems have access to memory and system resources of the processing module, and wherein the second vehicle-related application is incompatible with the first set of user libraries.

3. The system of claim 1, wherein the shared kernel is running on a first processor of the processing module, and wherein the first and second operating systems run on the shared kernel without virtualization.

4. The system of claim 1, wherein the processing module is installed in a vehicle, wherein the first execution environment is one of a personal computing device operating system and mobile device operating system, wherein the second execution environment is vehicle processing system operating system, and further including a secondary terminal environment, wherein the second operating system is associated with the secondary terminal environment.

5. The system of claim 1, further including a secondary terminal environment, wherein the processing module and the secondary terminal environment are connected with a single dock connector that includes a display interface and serial communications interface.

6. The system of claim 1, the processing module further including a physical memory device, wherein the first operating system is associated with a first frame buffer in the physical memory device and the second operating system is associated with a second frame buffer in the physical memory device, each of the first and second frame buffers being associated with respective first and second frame buffer devices in the shared kernel, wherein the first operating system renders an associated first graphical user interface by writing graphics data to the first frame buffer device, an external display driver of the shared kernel then writes the graphics data to the first operating system frame buffer for output by the processing module, wherein the second operating system renders an associated second graphical user interface by writing the graphics data to the second frame buffer device, an external display driver of the shared kernel then writes the graphics data to the second operating system frame buffer for output by the processing module.

7. The system of claim 6, wherein the first frame buffer is associated with and output to the display panel.

8. The system of claim 7, further including a secondary terminal environment, wherein the secondary terminal environment includes a second display device, and wherein the second frame buffer is associated with and output to the second display device.

9. The system of claim 8, wherein the second vehicle-related application is displayed on the second display device through the second frame buffer and wherein the processing module selects one of the first and second operating systems as a primary operating system based on whether or not the processing module is docked to a computing device.

10. The system of claim 1, the processing module further including a physical storage device, wherein the second execution environment is logically isolated from the first execution environment on the physical storage device.

11. The system of claim 1, further including an input device connected to the processing module, wherein input commands from the input device are available to the first operating system in the first execution environment and to the second operating system in the second execution environment.

12. The system of claim 11, wherein the first operating system is one of a mobile operating system and a desktop operating system, wherein the second operating system is the other of a mobile operating system and desktop operating system, wherein graphics data from an application executing in the first operating system is accessed directly by an application executing in the second operating system, whereby a surface of the application in the first operating system is maintained in a shared memory space and passed to the application in the second operating system by passing file descriptors to the shared memory, and wherein the second operating system accesses input commands from the input device through the shared kernel.

13. The system of claim 1, wherein the processing module is configured using a boot process that includes the steps of:
starting, in response to a power on event, a boot loader;
establishing, by the boot loader, the first execution environment;
starting, by the boot loader, the shared kernel;
initializing, by the shared kernel, the first operating system;
starting, by the shared kernel, the first application framework;
starting, in the first operating system, a first monitor service;
establishing, by the first monitor service, the second execution environment within the first execution environment; and
starting, by the first monitor service, the second application framework.

14. A method of providing multiple operating systems on a single physical processor of a processing module of a vehicle, the method comprising:
running a first application on a first operating system, the first operating system running on a shared kernel of the vehicle processing module and having a first application framework; and
running a second application on a second operating system, the second operating system running concurrently with the first operating system on the shared kernel and having a second application framework, wherein the second application is incompatible with the first application framework, wherein the first operating system is based on the shared kernel and the second operating system is not based on the shared kernel, wherein the first and second operating systems run independently on the shared kernel, and wherein at least one of the first and second applications is one of the following: a vehicle control application, an application associated with at least one vehicle function, an application related to a handicap and accessibility graphical user interface for a vehicle display panel, a vehicle satellite positioning system receiver application, an automotive navigation application, and a vehicle emergency service application.

15. The method of claim 14, wherein each of the first and second operating systems have access to memory and system resources of the processing module, wherein the first and second operating systems run on the shared kernel without virtualization, wherein the first operating system is one of a mobile operating system and a desktop operating system, wherein the second operating system is the other of a mobile operating system and desktop operating system, and further comprising:
allocating, by the shared kernel, a first frame buffer memory associated with the first operating system; and
allocating, by the shared kernel, a second frame buffer memory associated with the second operating system.

16. The method of claim 15, further comprising:
rendering, by the first operating system, the first application in the first frame buffer memory through the shared kernel; and
rendering, by the second operating system, the second application in the second frame buffer memory through the shared kernel, each of the first and second frame buffer memories being associated with respective first and second frame buffer devices in the shared kernel, wherein the first operating system renders an associated first graphical user interface by writing graphics data to the first frame buffer device, an external display driver of the shared kernel then writes the graphics data to the first operating system frame buffer memory for output by the processing module, wherein the second operating system renders an associated second graphical user interface by writing the graphics data to the second frame buffer device, an external display driver of the shared kernel then writes the graphics data to the second operating system frame buffer memory for output by the processing module.

17. A processing module of a vehicle including a tangible and non-transitory computer-readable medium storing instructions for a physical processor, the instructions, when executed, causing the processor to perform steps comprising:
running a first operating system in a first execution environment on a shared kernel, the first operating system having a first application framework supporting a first application; and
running a second operating system concurrently with the first operating system in a second execution environment on the shared kernel, the second operating system having a second application framework supporting a second application, wherein the second application is incompatible with the first application framework, wherein the first operating system is based on the shared kernel and the second operating system is not based on the shared kernel, wherein the first and second operating systems run independently on the shared kernel, and wherein at least one of the first and second applications is one of the following: a vehicle control application, an application associated with at least one vehicle function, an application related to a handicap and accessibility graphical user interface for a vehicle display panel, a vehicle satellite positioning system receiver application, an automotive navigation application, or an emergency service application.

18. The processing module of claim 17, wherein the second execution environment comprises a chrooted environment.

19. The processing module of claim 17, wherein each of the first and second operating systems have access to memory and system resources of the processing module, wherein the first and second operating systems run on the shared kernel without virtualization, and further comprising mobile telephony capabilities.

20. The processing module of claim 17, further comprising:
rendering, by the first operating system, the first application in the first frame buffer memory through the shared kernel; and
rendering, by the second operating system, the second application in the second frame buffer memory through the shared kernel, each of the first and second frame buffer memories being associated with respective first and second frame buffer devices in the shared kernel, wherein the first operating system renders an associated first graphical user interface by writing graphics data to the first frame buffer device, an external display driver of the shared kernel then writes the graphics data to the first operating system frame buffer memory for output by the processing module, wherein the second operating system renders an associated second graphical user interface by writing the graphics data to the second frame buffer device, an external display driver of the shared kernel then writes the graphics data to the second operating system frame buffer memory for output by the processing module.

21. The processing module of claim 17, further comprising:
rendering, by the first operating system, the first application in the first frame buffer memory through the shared kernel; and
rendering, by the second operating system, the second application in the second frame buffer memory through the shared kernel, each of the first and second frame buffer memories being associated with respective first and second frame buffer devices in the shared kernel, wherein the first operating system renders an associated first graphical user interface by writing graphics data to the first frame buffer device, an external display driver of the shared kernel then writes the graphics data to the first operating system frame buffer memory for output by the processing module, wherein the second operating system renders an associated second graphical user interface by writing the graphics data to the second frame buffer device, an external display driver of the shared kernel then writes the graphics data to the second operating system frame buffer memory for output by the processing module.

22. The processing module of claim 17, further comprising:
rendering, by the first operating system, the first application in the first frame buffer memory through the shared kernel; and
rendering, by the second operating system, the second application in the second frame buffer memory through the shared kernel, each of the first and second frame buffer memories being associated with respective first and second frame buffer devices in the shared kernel, wherein the first operating system renders an associated first graphical user interface by writing graphics data to the first frame buffer device, an external display driver of the shared kernel then writes the graphics data to the first operating system frame buffer memory for output by the processing module, wherein the second operating system renders an associated second graphical user interface by writing the graphics data to the second frame buffer device, an external display driver of the shared kernel then writes the graphics data to the second operating system frame buffer memory for output by the processing module.

23. The processing module of claim 17, wherein at least one of the first and second applications is one of the following: the vehicle control application, and the application associated with at least one vehicle function.

24. A method, comprising:
selecting, by a processor, a processing resource from among a plurality of processing resources on board a vehicle to execute simultaneously first and second operating systems, the first operating system being a native operating system of the selected processing resource and the second operating system not being a native operating system of selected processing resource, wherein the first operating system is a vehicle operating system and the second operating system is selected from a MAC™ operating system, an Android™ operating system, an Apple™ operating system, a Microsoft Windows™ operating system, a Nokia Symbian™ operating system, a Palm™ operating system, or an HP™ web operating system; and executing, by the processor executing the second operating system, an application on the selected processing resource and providing the results to the second processing resource for presentation to a user.

25. The method of claim 14, wherein the selected processing resource is installed in a vehicle, wherein the second execution environment is one of a MAC™ operating system and Microsoft Windows™ operating system, and further including a secondary terminal environment, wherein the second operating system is associated with the secondary terminal environment.

26. The method of claim 14, wherein the selected processing resource selects one of the first and second operating systems as a primary operating system based on whether or not the selected processing resource is docked to a computing device.

27. The method of claim 24, wherein the selection of the processing resource is based on one or more of where a user selected software application is located, by which output device a user desires to access the selected software application, the application and operating system requirements of the selected software application as compared to the capabilities of each of the processing resources, and power levels in each of the processing resources.

28. A method, comprising:
starting, in response to a power on event, a boot loader of an on board vehicle processing module;
establishing, by the boot loader and on the on board vehicle processing module, a first execution environment, wherein a first operating system runs in the first execution environment on a shared kernel, the first operating system having a first application framework supporting a first application;
starting, by the boot loader and on the on board vehicle processing module, the shared kernel;
initializing, by the shared kernel, the first operating system;
starting, by the shared kernel, the first application framework;
starting, in the first operating system, a first monitor service;
establishing, by the first monitor service, a second execution environment within the first execution environment, wherein a second operating system runs concurrently with the first operating system in the second execution environment on the shared kernel, the second operating system having a second application framework supporting a second application, wherein the second application is incompatible with the first application framework; and
starting, by the first monitor service, the second application framework.

29. The method of claim 28, wherein the first operating system is a vehicle operating system and the second operating system is selected from a MAC™ operating system, an Android™ operating system, an Apple™ operating system, a Microsoft Windows™ operating system, a Nokia Symbian™ operating system, a Palm™ operating system, and an HP™ web operating system.

30. The method of claim 28, wherein the first operating system is based on the shared kernel and the second operating system is not based on the shared kernel and wherein the first and second operating systems run independently on the shared kernel.

31. The method of claim 28, wherein the shared kernel is Linux-based and the second operating system is an Android™ operating system.

32. A vehicle, comprising:
a power source to propel the vehicle;
a display panel to provide graphical information to a vehicle occupant;
an on board processing module, comprising:
a first operating system running in a first execution environment on a shared kernel, the first operating system having a first application framework supporting a first application;
a second operating system running concurrently with the first operating system in a second execution environment on the shared kernel, the second operating system having a second application framework supporting a second application, wherein the second application is incompatible with the first application framework; and
a physical memory device, wherein the first operating system is associated with a first frame buffer in the physical memory device and the second operating system is associated with a second frame buffer in the physical memory device, each of the first and second frame buffers being associated with respective first and second frame buffer devices in the shared kernel, wherein the first operating system renders an associated first graphical user interface by writing graphics data to the first frame buffer device and an external display driver of the shared kernel then writes the graphics data to the first operating system frame buffer for output by the computing device, wherein the second operating system renders an associated second graphical user interface by writing the graphics data to the second frame buffer device and an external display driver of the shared kernel then writes the graphics data to the second operating system frame buffer for output by the computing device, and wherein at least one of the first and second applications is one of the following: a vehicle control application, application associated with at least one vehicle function, an application related to a handicap and accessibility graphical user interface for the display panel, a vehicle satellite positioning system receiver application, an automotive navigation application, or a vehicle emergency service application.

33. The system of claim 32, wherein the first operating system is based on the shared kernel and the second operating system is not based on the shared kernel and wherein the first and second operating systems run independently on the shared kernel.

34. The system of claim 32, wherein the first operating system is a vehicle operating system and the second operating system is one of a a MAC™ operating sysem, an Android™ operating system, an Apple™ operating system, a Microsoft Windows™ operating system, a Nokia Symbian™ operating system, a Palm™ operating system, and an HP™ web operating system.

35. The system of claim 32, wherein the first operating system is based on the shared kernel and the second operating system is not based on the shared kernel and wherein the first and second operating systems run independently on the shared kernel.

36. The system of claim 32, wherein the shared kernel is Linux-based and the second operating system is an Android™ operating system.

37. A vehicle, comprising:
a power source to propel the vehicle;
a display panel to provide graphical information to a vehicle occupant;
an on board processing module, comprising:
a first operating system running in a first execution environment on a shared kernel, the first operating system having a first application framework supporting a first vehicle-related application; and a second operating system running concurrently with the first operating system in a second execution environment on the shared kernel, the second operating system having a second application framework supporting a second vehicle-related application, wherein the second vehicle-related application is incompatible with the first application framework, wherein the first and second operating systems run independently on the shared kernel, and wherein at least one of the first and second vehicle-related applications is one of the following: a vehicle control application, an application associated with at least one vehicle function, or an emergency vehicle service application.

* * * * *